(12) United States Patent
Fukumura

(10) Patent No.: US 10,950,385 B2
(45) Date of Patent: Mar. 16, 2021

(54) MULTILAYER CERAMIC CAPACITOR WITH OUTER ELECTRODES INCLUDING RESIN LAYERS

(71) Applicant: Murata Manufacturing Co., Ltd., Nagaokakyo (JP)

(72) Inventor: Keisuke Fukumura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 10 days.

(21) Appl. No.: 16/171,390

(22) Filed: Oct. 26, 2018

(65) Prior Publication Data
US 2019/0131076 A1 May 2, 2019

(30) Foreign Application Priority Data
Oct. 31, 2017 (JP) .............................. JP2017-211319

(51) Int. Cl.
*H01G 4/232* (2006.01)
*H01G 4/30* (2006.01)
(Continued)

(52) U.S. Cl.
CPC .............. *H01G 4/232* (2013.01); *H01G 2/065* (2013.01); *H01G 4/008* (2013.01); *H01G 4/012* (2013.01);
(Continued)

(58) Field of Classification Search
CPC ........ H01G 4/2325; H01G 4/232; H01G 4/30; H01G 2/065; H01G 4/12; H01G 4/008; H01G 4/012
See application file for complete search history.

(56) References Cited

U.S. PATENT DOCUMENTS

| | | | |
|---|---|---|---|
| 9,978,523 B1 * | 5/2018 | Park | H01G 4/30 |
| 2002/0046861 A1 * | 4/2002 | Yokoyama | H01C 1/148 |
| | | | 174/565 |

(Continued)

FOREIGN PATENT DOCUMENTS

| | | | | |
|---|---|---|---|---|
| DE | 3528077 A1 * | 2/1987 | | H01G 4/248 |
| EP | 0229286 A1 * | 7/1987 | | H01G 2/065 |

(Continued)

OTHER PUBLICATIONS

Official Communication issued in Japanese Patent Application No. 2017-211319, dated Jan. 21, 2020.

*Primary Examiner* — David M Sinclair
(74) *Attorney, Agent, or Firm* — Keating & Bennett, LLP

(57) ABSTRACT

A multilayer ceramic capacitor includes a multilayer body including dielectric layers and inner electrode layers, and a pair of outer electrodes on end surfaces of the multilayer body and electrically connected to the inner electrode layers. The outer electrodes each include a base electrode layer, a resin electrode layer on a surface of the base electrode layer and including a thermosetting resin and a metal component, a resin layer not containing an electrically conductive component, and a plating layer on the resin electrode layer. The resin layers cover the base electrode layers in regions located on the second main surface side of the multilayer body, and the resin electrode layers cover the base electrode layers in portions where the resin layers are not located and cover the resin layers.

18 Claims, 20 Drawing Sheets

(51) Int. Cl.
*H01G 4/12* (2006.01)
*H01G 4/012* (2006.01)
*H01G 4/008* (2006.01)
*H01G 2/06* (2006.01)

(52) U.S. Cl.
CPC ............ *H01G 4/12* (2013.01); *H01G 4/2325* (2013.01); *H01G 4/30* (2013.01)

(56) References Cited

U.S. PATENT DOCUMENTS

| | | | | |
|---|---|---|---|---|
| 2011/0132637 A1* | 6/2011 | Otani | ............... | C08L 63/00 |
| | | | | 174/126.1 |
| 2013/0294006 A1* | 11/2013 | Kang | ............... | H01G 4/2325 |
| | | | | 361/301.4 |
| 2014/0290999 A1* | 10/2014 | Park | ............... | H01G 4/30 |
| | | | | 174/260 |
| 2015/0124370 A1* | 5/2015 | Ahn | ............... | H01G 4/224 |
| | | | | 361/272 |
| 2018/0144864 A1* | 5/2018 | Park | ............... | H01G 4/2325 |
| 2018/0144868 A1* | 5/2018 | Park | ............... | H01G 4/005 |
| 2018/0182554 A1* | 6/2018 | Park | ............... | H01G 4/30 |

FOREIGN PATENT DOCUMENTS

| | | | | |
|---|---|---|---|---|
| JP | 11-162771 A | | 6/1999 | |
| JP | 2006049753 A | * | 2/2006 | |
| JP | 2009-088319 A | | 4/2009 | |
| JP | 2014-027085 A | | 2/2014 | |
| WO | WO-2014024593 A1 | * | 2/2014 | ............ H01G 4/232 |

* cited by examiner

SECTIONAL VIEW TAKEN ALONG LINE III-III

SECTIONAL VIEW TAKEN ALONG LINE IV-IV

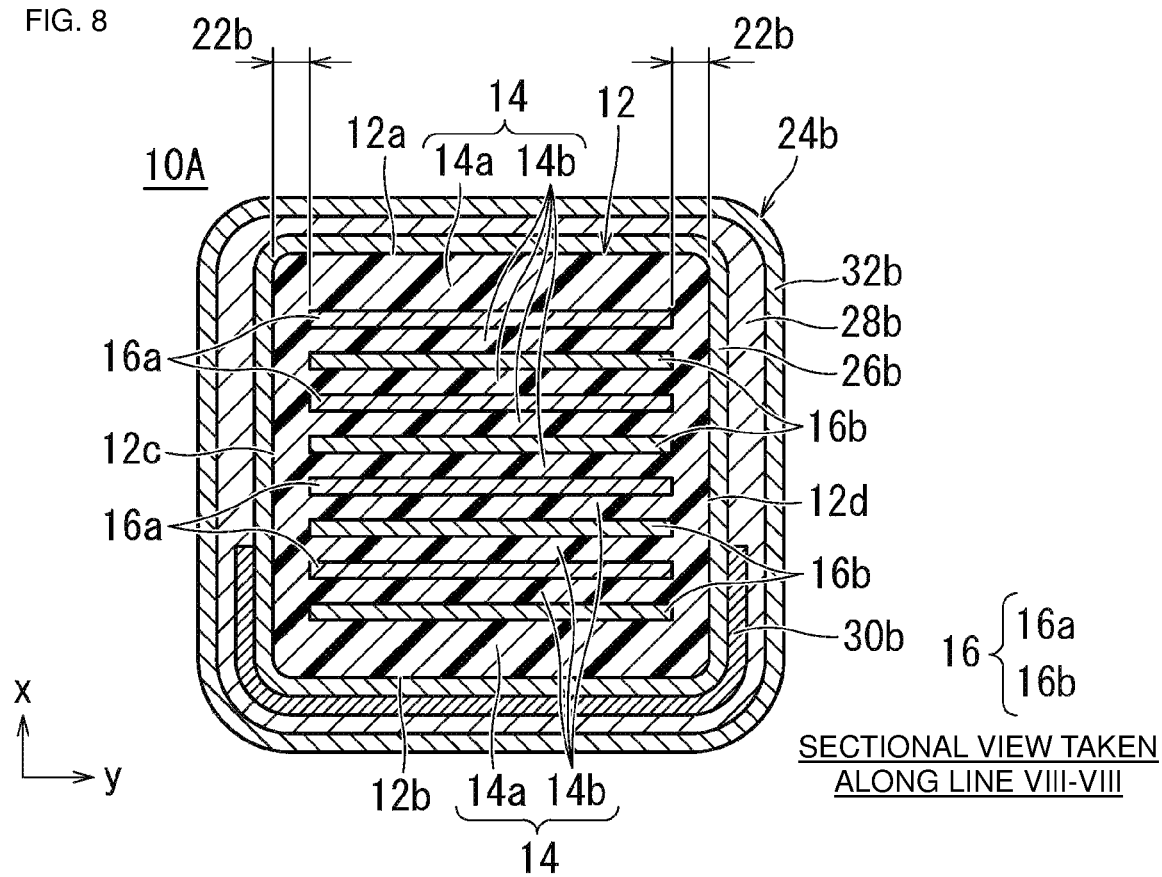
FIG. 8 — SECTIONAL VIEW TAKEN ALONG LINE VIII-VIII
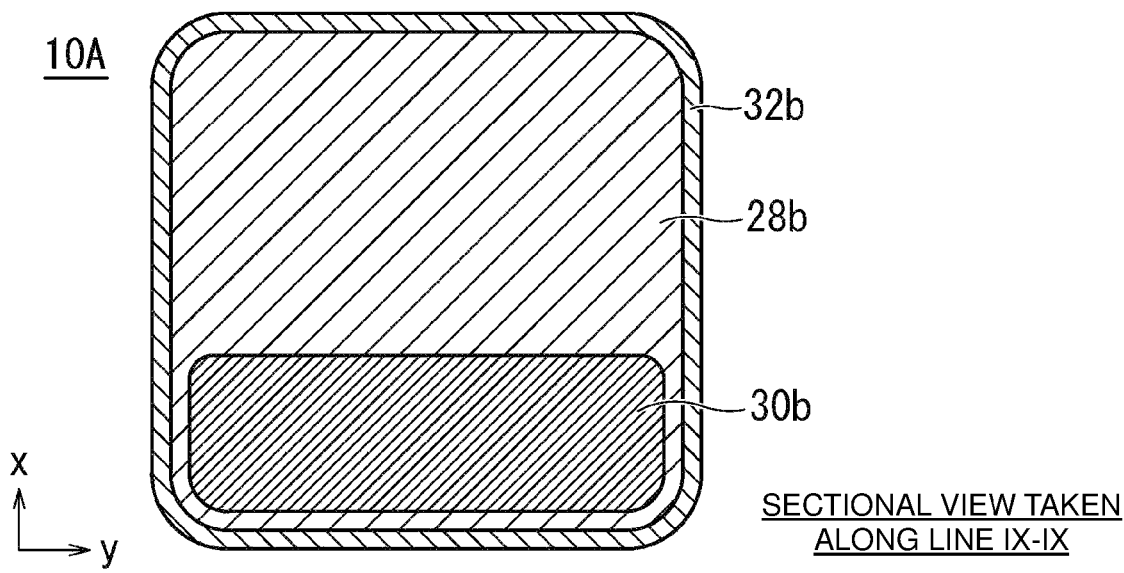
FIG. 9 — SECTIONAL VIEW TAKEN ALONG LINE IX-IX

SECTIONAL VIEW TAKEN ALONG LINE XII-XII

SECTIONAL VIEW TAKEN ALONG LINE XIII-XIII

SECTIONAL VIEW TAKEN ALONG LINE XVI-XVI

SECTIONAL VIEW TAKEN ALONG LINE XVII-XVII

SECTIONAL VIEW TAKEN ALONG LINE XX-XX

SECTIONAL VIEW TAKEN ALONG LINE XXI-XXI

SECTIONAL VIEW TAKEN ALONG LINE XXIV-XXIV

SECTIONAL VIEW TAKEN ALONG LINE XXV-XXV

MULTILAYER CERAMIC CAPACITOR WITH OUTER ELECTRODES INCLUDING RESIN LAYERS

CROSS REFERENCE TO RELATED APPLICATIONS

This application claims the benefit of priority to Japanese Patent Application No. 2017-211319 filed on Oct. 31, 2017. The entire contents of this application are hereby incorporated herein by reference.

BACKGROUND OF THE INVENTION

1. Field of the Invention

The present invention relates to a multilayer ceramic capacitor, and in particular relates to a multilayer ceramic capacitor that includes outer electrodes with a multilayer structure.

2. Description of the Related Art

In recent years, ceramic electronic components such as multilayer ceramic capacitors have come to be used in harsher environments than in the past.

For example, there is a demand for multilayer ceramic capacitors used in mobile devices such as cellular phones and portable music players to be able to withstand impacts such as an impact resulting from being dropped. Specifically, it is necessary to ensure that such a multilayer ceramic capacitor does not become detached from the mounting substrate and does not crack even when an impact is received such as an impact resulting from being dropped. In addition, there is a demand for multilayer ceramic capacitors used in in-vehicle devices such as an ECU to be able to withstand shocks such as a shock resulting from a heat cycle. Specifically, it is necessary to ensure that cracks are not generated in such a multilayer ceramic capacitor even when the multilayer ceramic capacitor experiences a heat cycle and the mounting substrate undergoes linear expansion and contraction and consequently receives a bending stress and a tensile stress acts on the outer electrodes.

A multilayer ceramic capacitor is known that includes outer electrodes that each include a thermosetting resin layer with the aim of responding to the above-described demands. Japanese Unexamined Patent Application Publication No. 11-162771 discloses that a countermeasure is taken to ensure that cracks are not generated in a capacitor body (multilayer body) even in a harsh environment by forming an epoxy-based thermosetting resin layer between an electrode layer and Ni plating of the related art (bending resistance is improved).

However, in the case of a structure in which a resin layer that is composed of an epoxy-based thermosetting resin is provided on an electrode layer for example as disclosed in Japanese Unexamined Patent Application Publication No. 11-162771, if a leading end of the electrode layer is not definitely covered by the resin layer, when there is an impact due to the device being dropped or a bending stress is generated in the mounting substrate, the resulting stress cannot be adequately absorbed by the resin layer (in other words, cohesive fractures cannot be generated inside the resin layer), and there is a risk of a crack being generated in the capacitor body.

In recent years, with the increasing miniaturization of electronic devices and the like, realization of design assurance for this kind of situation, specifically, control of the formation of resin electrode layers and ensuring the accuracy with which the resin electrode layers are formed, has become more difficult in various ways, and it is not easy to ensure that the leading end of an electrode layer is covered with certainty.

SUMMARY OF THE INVENTION

Accordingly, preferred embodiments of the present invention provide highly reliable multilayer ceramic capacitors that enable design assurance of mechanical strength to be easily achieved.

A multilayer ceramic capacitor according to a preferred embodiment of the present invention includes a multilayer body including a plurality of dielectric layers and a plurality of inner electrode layers that are stacked on top of one another, and including a first main surface and a second main surface that face each other in a height direction, a first side surface and a second side surface that face each other in a width direction, which is perpendicular or substantially perpendicular to the height direction, and a first end surface and a second end surface that face each other in a length direction, which is perpendicular or substantially perpendicular to the height direction and the width direction; and a pair of outer electrodes that are connected to the inner electrode layers and are arranged on the end surfaces, a portion of the first main surface, a portion of the second main surface, a portion of the first side surface, and a portion of the second side surface. The second main surface of the multilayer body defines and functions as a mounting surface. The pair of outer electrodes each include a base electrode layer that includes an electrically conductive metal and a glass component, a resin electrode layer that includes a thermosetting resin and a metal component, and a resin layer that does not include an electrically conductive component. The base electrode layers respectively extend from the first end surface and the second end surface onto a portion of the first main surface and a portion of the second main surface, and onto a portion of the first side surface and a portion of the second side surface. The resin layers are respectively provided so as to cover the base electrode layers in at least regions located on the second main surface side. The resin electrode layers cover the base electrode layers in portions where the resin layers are not located and cover the resin layers.

In a multilayer ceramic capacitor according to a preferred embodiment of the present invention, the resin layers preferably respectively extend from the second main surface side onto at least a portion of the first end surface and at least a portion of the second end surface.

In addition, in a multilayer ceramic capacitor according to a preferred embodiment of the present invention, the resin layers preferably entirely cover a region of the second main surface where the base electrode layers are not located.

Furthermore, in a multilayer ceramic capacitor according to a preferred embodiment of the present invention, the resin electrode layers preferably directly cover the base electrode layers in portions where the resin layers are not located.

In addition, in a multilayer ceramic capacitor according to a preferred embodiment of the present invention, a total of a thickness of the resin layer on a portion of the base electrode layer located on the first main surface, the second main surface, the first side surface, or the second side surface and a thickness of a portion of the resin electrode layer located on the resin layer is preferably identical or substantially identical to a thickness of a portion of the resin electrode layer directly provided on the base electrode layer located on the first end surface or the second end surface.

In addition, in a multilayer ceramic capacitor according to a preferred embodiment of the present invention, plating layers are preferably provided on the resin electrode layers.

In addition, in a multilayer ceramic capacitor according to a preferred embodiment of the present invention, the resin layers preferably cover the base electrode layers in at least portions of regions located on the first main surface side, and the resin electrode layers preferably cover the base electrode layers in portions where the resin layers are not located and preferably cover the resin layers.

In addition, in a multilayer ceramic capacitor according to a preferred embodiment of the present invention, the resin layers preferably cover the base electrode layers in regions located on the first side surface side and the second side surface side, and the resin electrode layers preferably cover the base electrode layers in portions where the resin layers are not located and preferably cover the resin layers.

Furthermore, in a multilayer ceramic capacitor according to a preferred embodiment of the present invention, the resin layers are preferably arranged on the first side surface side and the second side surface side so as to extend onto at least a portion of the first end surface and at least a portion of the second end surface, and the resin electrode layers are preferably connected to the base electrode layers only at center portions of the first end surface and the second end surface and preferably cover the resin layers.

In a multilayer ceramic capacitor according to a preferred embodiment of the present invention, the resin layers are provided so as to at least cover the portions of the base electrode layers located on the second main surface side, and therefore the leading end portions of the base electrode layers are able to be covered by the resin layers without considering the control method used when forming the resin electrode layers and the accuracy. In addition, since the resin layers do not contain an electrically conductive component, the resin layers have a higher degree of elasticity. Consequently, when a dropping impact occurs or bending stress resulting from bending of a mounting substrate is generated, the resulting stress is able to be absorbed with a greater degree of certainty, and the occurrence of a situation in which cracks are generated in the multilayer body is reduced.

Furthermore, according to a multilayer ceramic capacitor according to a preferred embodiment of the present invention, when the resin layers are formed so as to entirely cover a region of the second main surface where the base electrode layers are not arranged, there is no need to perform masking in order to cause a portion of the second main surface to be exposed in the process of manufacturing the multilayer ceramic capacitor, and therefore the resin layers are able to be easily formed.

In addition, according to a multilayer ceramic capacitor according to a preferred embodiment of the present invention, when the resin electrode layers cover the base electrode layers in the portions where the resin layers are not located, stress generated when a dropping impact occurs or bending stress resulting from the substrate being bent is able to be absorbed.

In addition, according to a multilayer ceramic capacitor according to a preferred embodiment of the present invention, when the total of the thickness of the resin layer on a portion of the base electrode layer located on the first main surface or the second main surface or the first side surface or the second side surface and the thickness of a portion of the resin electrode layer located on the resin layer is identical or substantially identical to the thickness of a portion of the resin electrode layer arranged directly on the base electrode layer located on the first end surface or the second end surface, the advantageous effects of preferred embodiments of the present invention described above are able to be obtained while maintaining the product dimensions of the multilayer ceramic capacitor.

In addition, with the multilayer ceramic capacitors according to the preferred embodiments of the present invention, when the resin layers are provided so as to cover the base electrode layers in at least portions of regions located on the first main surface side and the resin electrode layers cover the base electrode layers in ports where the resin layers are not located and cover the resin layers, the multilayer ceramic capacitors are able to be mounted on a substrate using either the first main surface or the second main surface, and there is no need to determine the mounting direction of the multilayer ceramic capacitors when taping the multilayer ceramic capacitors (that is, when storing the multilayer ceramic capacitors in a tape molded to have recessed portions).

Furthermore, according to multilayer ceramic capacitors according to preferred embodiments of the present invention, when the resin layers are provided so as to cover the base electrode layers in regions located on the first side surface and the second side surface, and the resin electrode layers cover the base electrode layers in portions where the resin layers are not located and cover the resin layers, the multilayer ceramic capacitors are able to be mounted on a substrate using any of the first main surface, the second main surface, the first side surface, and the second side surface, and there is no need to determine the mounting direction of the multilayer ceramic capacitors when taping the multilayer ceramic capacitor.

In addition, according to the multilayer ceramic capacitors according to preferred embodiments of the present invention, when the resin layers are arranged on the first side surface side and the second side surface side so as to extend onto at least portion of the first end surface and at least portion of the second end surface, and the resin electrode layers are connected to the base electrode layers at only center portions of the first end surface and the second end surface and cover the resin layers, the multilayer ceramic capacitors are able to be mounted on a substrate using any of the first main surface, the second main surface, the first side surface, and the second side surface, there is no need to determine the mounting direction of the multilayer ceramic capacitors when taping the multilayer ceramic capacitors, and an electrical conduction between the base electrode layers and the resin electrode layers and so on is also able to be secured.

According to the preferred embodiments of the present invention, highly reliable multilayer ceramic capacitors are structured such that design assurance of mechanical strength is easily achieved.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 8 is a sectional view that is taken along line VIII-VIII in FIG. 7 and illustrates the multilayer ceramic capacitor according to the second modification of the first preferred embodiment of the present invention.

FIG. 9 is a sectional view that is taken along line IX-IX in FIG. 7 and illustrates the multilayer ceramic capacitor according to the second modification of the first preferred embodiment of the present invention.

DETAILED DESCRIPTION OF THE PREFERRED EMBODIMENTS

First Preferred Embodiment

Figure 1:
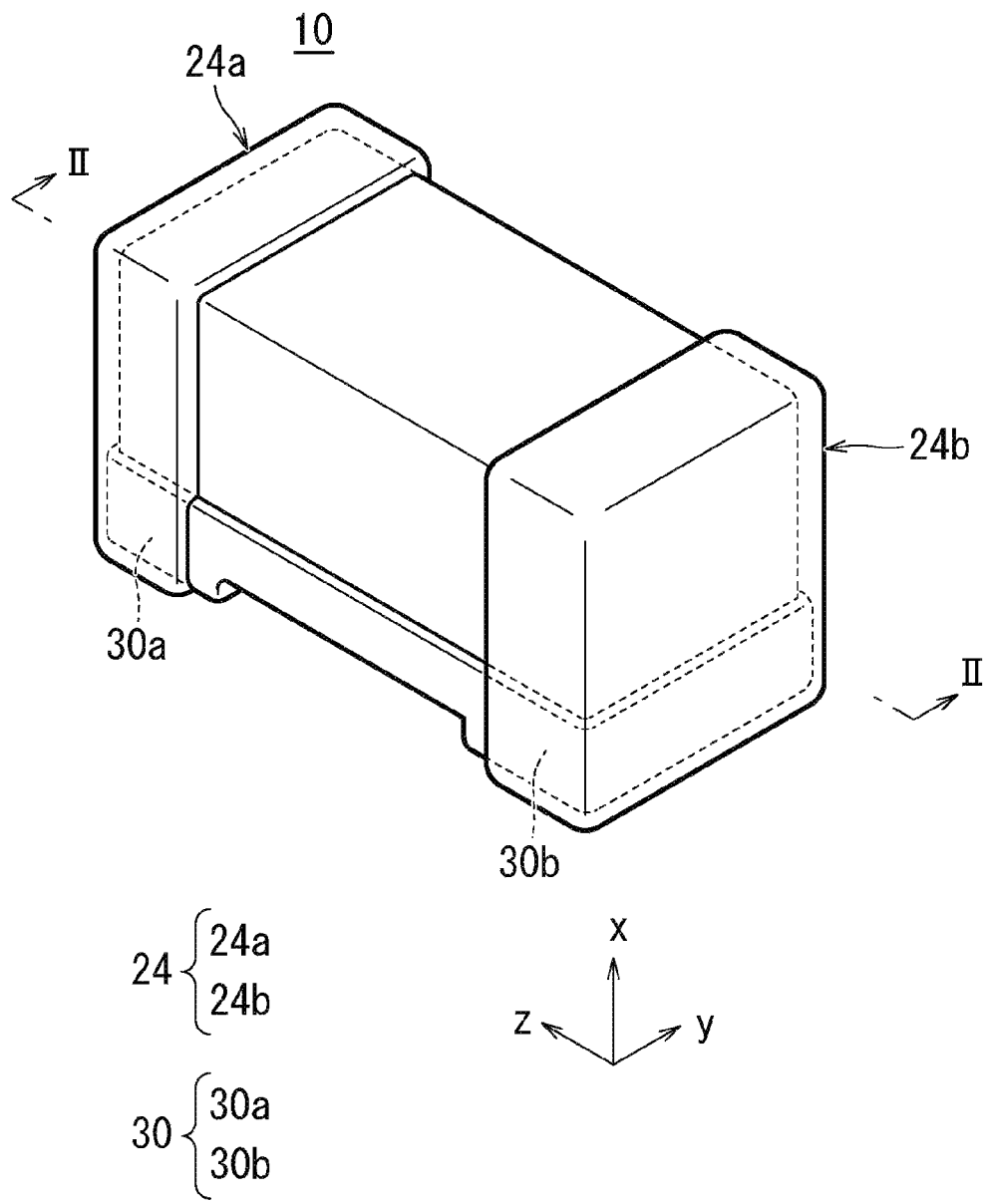
FIG. 1 is an external perspective view illustrating a multilayer ceramic capacitor according to a first preferred embodiment of the present invention.
Figure 2:
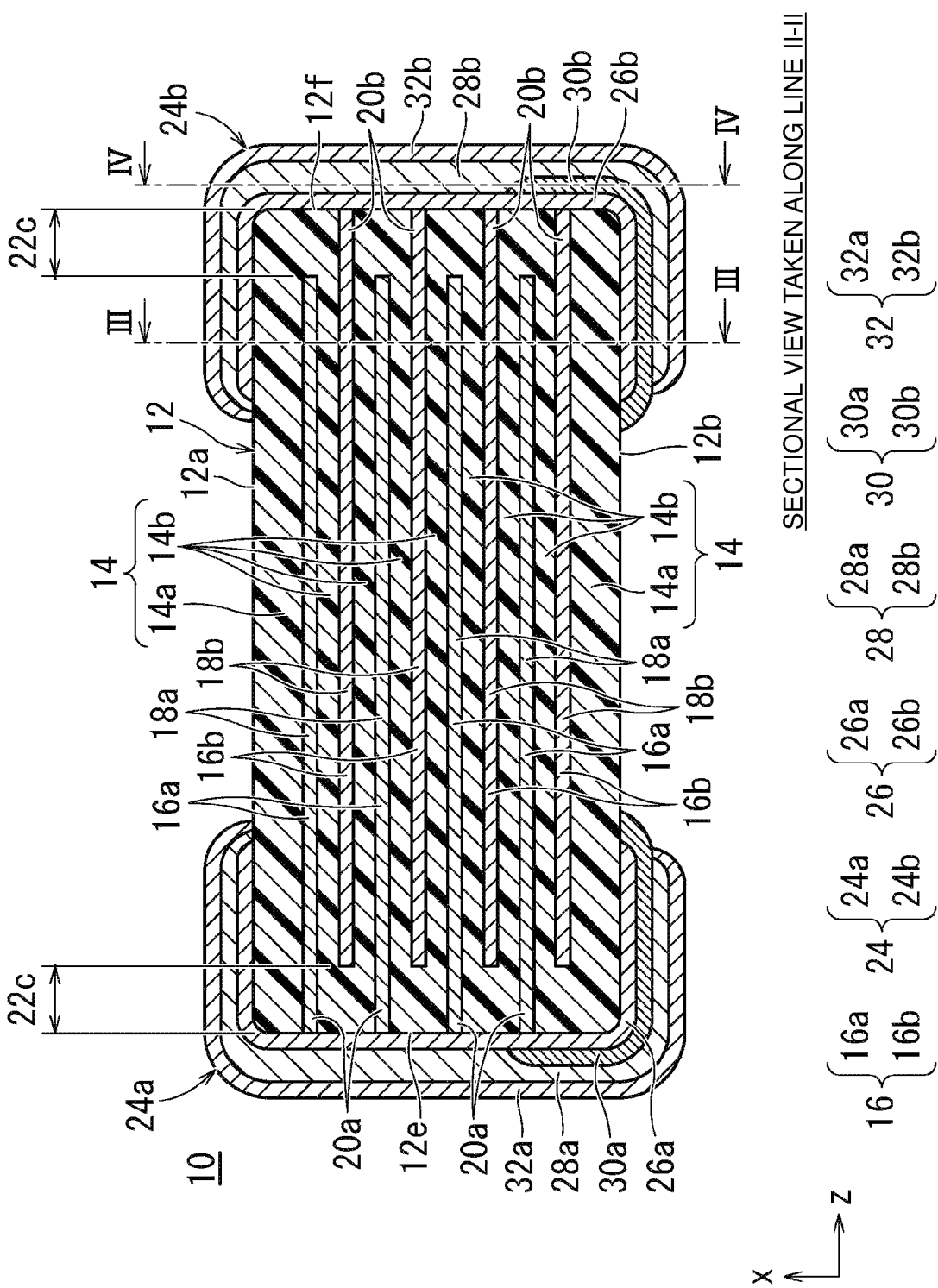
FIG. 2 is a sectional view that is taken along line II-II in FIG. 1 and illustrates the multilayer ceramic capacitor according to the first preferred embodiment of the present invention.
Figure 3:
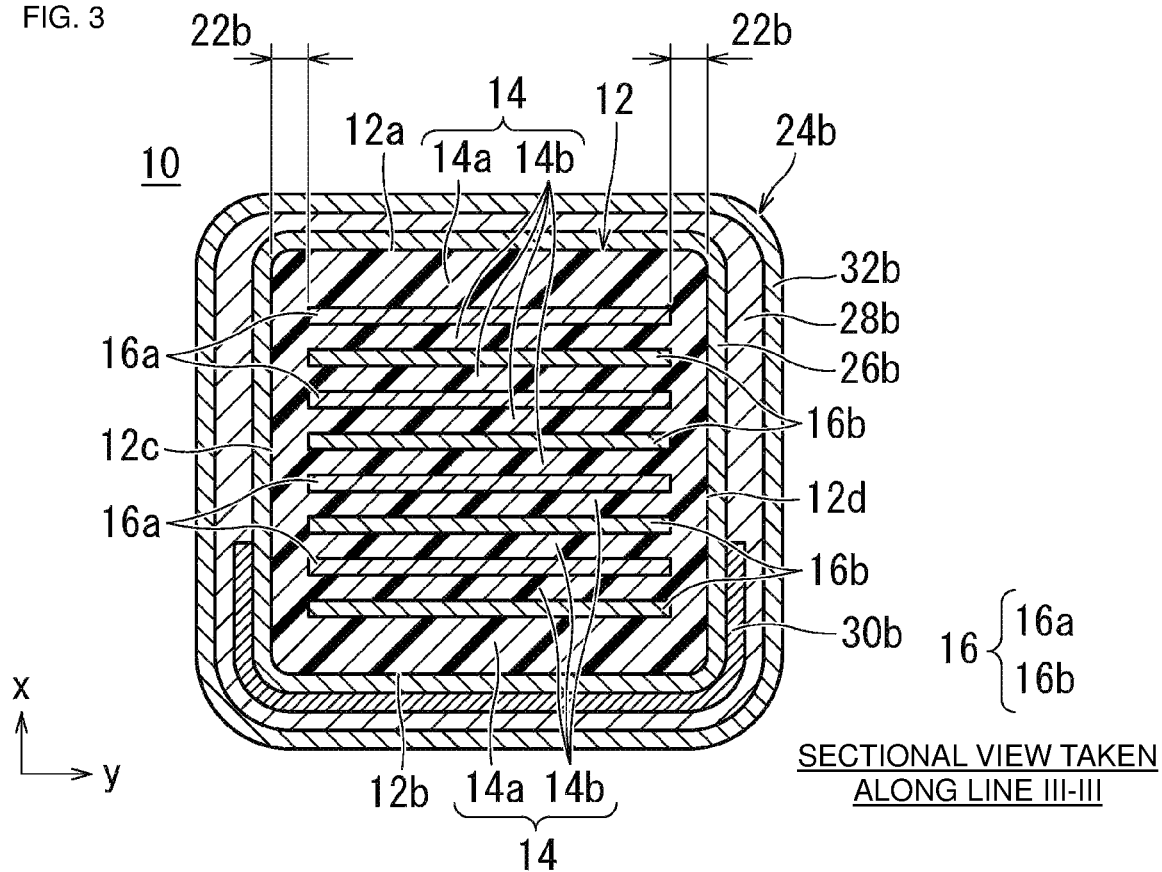
FIG. 3 is a sectional view that is taken along line III-III in FIG. 2 and illustrates the multilayer ceramic capacitor according to the first preferred embodiment of the present invention.
Figure 4:
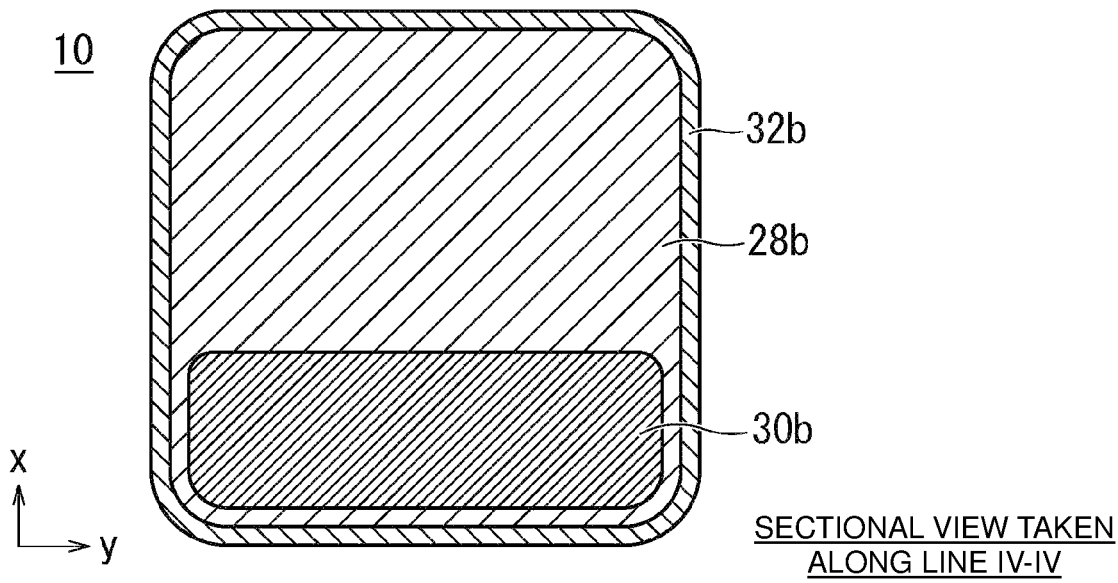
FIG. 4 is a sectional view that is taken along line IV-IV in FIG. 2 and illustrates the multilayer ceramic capacitor according to the first preferred embodiment of the present invention.

Hereafter, a multilayer ceramic capacitor according to a first preferred embodiment of the present invention will be described. FIG. 1 is an external perspective view illustrating a multilayer ceramic capacitor according to a first preferred embodiment of the present invention. FIG. 2 is a sectional view that is taken along line II-II in FIG. 1 and illustrates the multilayer ceramic capacitor according to the first preferred embodiment of the present invention, and FIG. 3 is a sectional view that is taken along line III-III in FIG. 2 and illustrates the multilayer ceramic capacitor according to the first preferred embodiment of the present invention. FIG. 4 is a sectional view that is taken along line IV-IV in FIG. 2 and illustrates the multilayer ceramic capacitor according to the first preferred embodiment of the present invention.

As illustrated in FIGS. 1 to 3, a multilayer ceramic capacitor 10 includes a substantially rectangular parallelepiped shaped multilayer body 12.

The multilayer body 12 includes a plurality of dielectric layers 14 and a plurality of inner electrode layers 16 that are stacked on top of one another. In addition, the multilayer body 12 includes a first main surface 12a and a second main surface 12b that face each other in a height direction x, a first side surface 12c and a second side surface 12d that face each other in a width direction y, which is perpendicular or substantially perpendicular to the height direction x, and a first end surface 12e and a second end surface 12f that face each other in a length direction z, which is perpendicular or substantially perpendicular to the height direction x and the width direction y. Corner portions and edge portions of the multilayer body 12 may be rounded. The term "corner portion" refers to a portion of the multilayer body where 3 adjacent surfaces thereof intersect and the term "edge portion" refers to a portion of the multilayer body where 2 adjacent surfaces thereof intersect. In addition, recesses and protrusions may be provided on portion of or the entirety of each of the first main surface 12a and the second main surface 12b, the first side surface 12c and the second side surface 12d, and the first end surface 12e and the second end surface 12f.

The multilayer body 12 includes outer layer portions 14a that are formed of a plurality of dielectric layers 14 and an inner layer portion 14b that includes one or a plurality of dielectric layers 14 and a plurality of inner electrode layers 16 respectively arranged on the dielectric layers 14. The outer layer portions 14a are located at the first main surface 12a side and the second main surface 12b side of the multilayer body 12, and are agglomerations of a plurality of dielectric layers 14 located between the first main surface 12a and the inner electrode layer 16 closest to the first main surface 12a and a plurality of dielectric layers 14 located between the second main surface 12b and the inner electrode layer 16 closest to the second main surface 12b. The region sandwiched between the outer layer portions 14a defines the inner layer portion 14b. The thickness of each outer layer portion 14a is preferably around 10-300 μm, for example.

The number of stacked dielectric layers 14 is not particularly limited, but is preferably around 73 to 361 including the outer layer portions 14a, for example.

The dimensions of the multilayer body 12 are not particularly limited, but the dimension of the multilayer body 12 in the length direction z is preferably around 0.230-0.540 mm, the dimension of the multilayer body 12 in the width direction y is preferably around 0.112 mm-0.280 mm, and the dimension of the multilayer body 12 in the height direction x is preferably around 0.112-0.280 mm, for example.

The dielectric layers 14 can be formed of a dielectric material, for example. A dielectric ceramic that includes $BaTiO_3$, $CaTiO_3$, $SrTiO_3$, $CaZrO_3$, or the like as a main component can be used as such a dielectric material, for example. In the case where such a dielectric material is included as a main component, a material may be used that is obtained by adding, to the main component, a sub-component of for example a Mn compound, an Fe compound, a Cr compound, a Co compound, a Ni compound or the like in a smaller amount than the main component in accordance with the desired characteristics of the multilayer body 12.

It is preferable that the thickness of each dielectric layer 14 after firing be around 0.4-20 μm, for example.

The multilayer body 12 includes a plurality of first inner electrode layers 16a and a plurality of second inner electrode layers 16b, which each have a rectangular or substantially rectangular shape, for example, as the plurality of inner electrode layers 16. The plurality of first inner electrode layers 16a and the plurality of second inner electrode layers 16b are buried so as to be located in an alternating manner at regular intervals with the dielectric layers 14 interposed therebetween in the height direction x of the multilayer body 12.

The first inner electrode layers 16a each include a first facing electrode portion 18a that faces the second inner electrode layers 16b, and a first extension electrode portion 20a that is located at one end of the first inner electrode layer 16a and extends from the first facing electrode portion 18a to the first end surface 12e of the multilayer body 12. An end portion of the first extension electrode portion 20a extends to and is exposed at the first end surface 12e.

The second inner electrode layers 16b each include a second facing electrode portion 18b that faces the first inner electrode layers 16a, and a second extension electrode portion 20b that is located at one end of the second inner electrode layer 16b and extends from the second facing electrode portion 18b to the second end surface 12f of the multilayer body 12. An end portion of the second extension electrode portion 20b extends to and is exposed at the second end surface 12f.

The multilayer body 12 includes side portions (hereafter, referred to as "W gaps") 22b between one end of each of the first facing electrode portions 18a and the second facing electrode portions 18b in the width direction y and the first side surface 12c, and between the other end of each of the first facing electrode portions 18a and the second facing electrode portions 18b in the width direction y and the second side surface 12d. In addition, the multilayer body 12 includes end portions (hereafter, referred to as "L gaps") 22c between the end portions, on the opposite side from the first extension electrode portions 20a, of the first inner electrode layers 16a and the second end surface 12f, and between the end portions, on the opposite side from the second extension electrode portions 20b, of the second inner electrode layers 16b and the first end surface 12e.

The inner electrode layers 16 can be formed of a suitable electrically conductive material such as a metal such as Ni, Cu, Ag, Pd, Au, or the like, or an alloy containing at least one of these metals such as an Ag—Pd alloy. The inner electrode layers 16 may further include dielectric particles having a similar composition to the ceramic included in the dielectric layers 14.

The thickness of each inner electrode layer 16 is preferably around 0.2-2.0 μm, for example. In addition, the number of inner electrode layers 16 is preferably around 2-1600, for example. Furthermore, the proportion of each dielectric layer 14 covered by the corresponding inner electrode layer 16 is preferably around 50-95%, for example.

The inner electrode layers 16 may be parallel or substantially parallel to a mounting substrate surface or may be provided so as to be perpendicular or substantially perpendicular to the substrate surface, but are preferably provided so as to be parallel or substantially parallel to the substrate surface.

Outer electrodes 24 are provided on the first end surface 12e side and the second end surface 12f side of the multilayer body 12. The outer electrodes 24 include a first outer electrode 24a and a second outer electrode 24b.

The first outer electrode 24a is provided on the first end surface 12e of the multilayer body 12, and extends from the first end surface 12e and covers a portion of each of the first main surface 12a, the second main surface 12b, the first side surface 12c, and the second side surface 12d. In this case, the first outer electrode 24a is electrically connected to the first extension electrode portions 20a of the first inner electrode layers 16a.

The second outer electrode 24b is provided on the second end surface 12f of the multilayer body 12, and extends from the second end surface 12f and covers a portion of each of the first main surface 12a, the second main surface 12b, the first side surface 12c, and the second side surface 12d. In this case, the second outer electrode 24b is electrically connected to the second extension electrode portions 20b of the second inner electrode layers 16b.

An electrostatic capacitance is generated inside the multilayer body 12 as a result of the first facing electrode portions 18a of the first inner electrode layers 16a and the second facing electrode portions 18b of the second inner electrode layers 16b facing each other with the dielectric layers 14 interposed therebetween. Therefore, an electrostatic capacitance is obtained between the first outer electrode 24a, which is connected to the first inner electrode layers 16a, and the second outer electrode 24b, which is connected to the second inner electrode layers 16b, and the characteristics of a capacitor are realized.

The outer electrodes 24 include base electrode layers 26 that include an electrically conductive metal and a glass component, resin electrode layers 28 that include a thermosetting resin and a metal component, resin layers 30 that do not include an electrically conductive component, and plating layers 32.

The base electrode layers 26 includes a first base electrode layer 26a and a second base electrode layer 26b.

The first base electrode layer 26a is provided on the first end surface 12e of the multilayer body 12, and extends from the first end surface 12e and covers a portion of each of the first main surface 12a, the second main surface 12b, the first side surface 12c, and the second side surface 12d.

In addition, the second base electrode layer 26b is provided on the second end surface 12f of the multilayer body 12, and extends from the second end surface 12f and covers a portion of each of the first main surface 12a, the second main surface 12b, the first side surface 12c, and the second side surface 12d.

In addition, the first base electrode layer 26a may be provided on only the first end surface 12e of the multilayer body 12, and the second base electrode layer 26b may be provided on only the second end surface 12f of the multilayer body 12.

The base electrode layers 26 include an electrically conductive metal and a glass component. For example, at least one selected from among Cu, Ni, Ag, Pd, an Ag—Pd alloy, Au, and the like may be included as a metal of the base electrode layers 26. In addition, at least one selected from among B, Si, Ba, Mg, Al, Li, and the like may be included as the glass of the base electrode layers 26. The base electrode layers 26 may include a plurality of layers. The base electrode layers 26 may be formed by applying an electrically conductive paste including glass and a metal to the multilayer body 12 and then performing baking, the base electrode layers 26 may be formed so as to be fired at the same time as the dielectric layers 14 and the inner electrode layers 16, or the base electrode layers 26 may be formed by being baked after the dielectric layers 14 and the inner electrode layers 16 have been fired. The thickness of the thickest portion of each base electrode layer 26 is preferably around 10-150 μm, for example.

The resin electrode layers 28 include a first resin electrode layer 28a and a second resin electrode layer 28b.

The first resin electrode layer 28a covers the first base electrode layer 26a with the resin layer 30 interposed therebetween in a region that is located on the second main surface 12b side relative to a center portion of the first end surface 12e. Specifically, the first resin electrode layer 28a is provided on the surface of the first base electrode layer 26a on the first end surface 12e, and covers the first base electrode layer 26a with the resin layer 30 interposed therebetween on the surface of a portion of the first base electrode layer 26a located on the second main surface 12b, the surface of a portion of the first base electrode layer 26a located on the second main surface 12b side of the first end surface 12e relative to the center portion of the first end surface 12e, the surface of a portion of the first base electrode layer 26a located on the second main surface 12b side of the first side surface 12c relative to a center portion of the first side surface 12c, and the surface of a portion of the first base electrode layer 26a located on the second main surface 12b side of the second side surface 12d relative to a center portion of the second side surface 12d.

The second resin electrode layer 28b covers the second base electrode layer 26b with the resin layer 30 interposed therebetween in a region that is located on the second main surface 12b side relative to a center portion of the second end surface 12f. Specifically, the second resin electrode layer 28b is provided on the surface of the second base electrode layer 26b on the second end surface 12f, and covers the second base electrode layer 26b with the resin layer 30 interposed therebetween on the surface of a portion of the second base electrode layer 26b located on the second main surface 12b, the surface of a portion of the second base electrode layer 26b located on the second main surface 12b side of the second end surface 12f relative to the center portion of the second end surface 12f, the surface of a portion of the second base electrode layer 26b located on the second main surface 12b side of the first side surface 12c relative to the center portion of the first side surface 12c, and the surface of a portion of the second base electrode layer 26b located on the second main surface 12b side of the second side surface 12d relative to the center portion of the second side surface 12d.

In addition, the first resin electrode layer 28a directly covers the first base electrode layer 26a in a region of the first end surface 12e that is located on the first main surface 12a side relative to a center portion of the first end surface 12e. In addition, the second resin electrode layer 28b directly covers the second base electrode layer 26b in a region of the second end surface 12f that is located on the first main surface 12a side relative to a center portion of the second end surface 12f.

At this time, the resin electrode layers 28 that cover the base electrode layers 26 preferably completely cover the base electrode layers 26, but the resin electrode layers 28 may instead be shorter than the base electrode layers 26 and do not necessarily have to cover the leading end portions of the base electrode layers 26.

In addition, as described above, the first resin electrode layer 28a directly covers the first base electrode layer 26a in a region located on the first main surface 12a side of the first end surface 12e relative to the center portion of the first end surface 12e and the second resin electrode layer 28b directly covers the second base electrode layer 26b in a region located on the first main surface 12a side of the second end surface 12f relative to the center portion of the second end surface 12f, but the resin electrode layers 28 do not necessarily have to cover these regions.

The combined thickness of the resin layer 30 located on the surface of the first base electrode layer 26a and the corresponding portion of the first resin electrode layer 28a located on the surface of the resin layer 30 is preferably identical or substantially identical to the thickness of the portion of the first resin electrode layer 28a that is directly provided on the surface of the first base electrode layer 26a. Similarly, the combined thickness of the resin layer 30 located on the surface of the second base electrode layer 26b and the corresponding portion of the second resin electrode layer 28b located on the surface of the resin layer 30 is preferably identical or substantially identical to the thickness of the portion of the second resin electrode layer 28b that is directly provided on the surface of the second base electrode layer 26b.

The lengths of the portions of the resin electrode layers 28 located on the first main surface 12a and the second main surface 12b in a direction that connects the first end surface 12e and the second end surface 12f and the lengths of the portions of the resin electrode layers 28 located on the first side surface 12c and the second side surface 12d in the direction that connects the first end surface 12e and the second end surface 12f are preferably around 100-200 µm, for example.

The thicknesses of the portions of the resin electrode layers 28 located on the first main surface 12a and the second main surface 12b or on the first side surface 12c and the second side surface 12d are preferably around 10-25 µm, for example. In addition, the thicknesses of the portions of the resin electrode layers 28 located on the first end surface 12e and the second end surface 12f are preferably around 10-25 µm, for example.

The resin electrode layers 28 include a thermosetting resin and a metal component. Since the resin electrode layers 28 include a thermosetting resin, the resin electrode layers 28 are more pliable than the base electrode layers 26, which are composed of a plating film or fired body including an electrically conductive paste, for example. Therefore, even in the case where a physical impact or a shock caused by a heat cycle acts on the multilayer ceramic capacitor 10, the resin electrode layers 28 define and function cushioning layers and the generation of cracks in the multilayer ceramic capacitor 10 is able to be prevented.

As specific examples of the thermosetting resin included in the resin electrode layers 28, any one of various known thermosetting resins such as an epoxy resin, a phenol resin, a urethane resin, a silicone resin, and a polyimide resin can be used, for example. Among these resins, an epoxy resin, which is excellent in terms of heat resistance, moisture resistance, adhesiveness, and so on, is the most suitable resin. It is preferable that the resin electrode layers 28 include a curing agent along with the thermosetting resin. As the curing agent, in the case where an epoxy resin is used as a base resin, any of various known compounds such as a phenol-based compound, an amine-based compound, an acid anhydride-based compound, an imidazole-based compound, and so on can be used as a curing agent for the epoxy resin.

As the metal included in the resin electrode layers 28, Ag, Cu, or an alloy of either of these metals is able to be used. In addition, a substance obtained by coating the surfaces of metal powder particles with Ag is able to be used. Cu or Ni is preferably used as the material of the metal particles when a substance obtained by coating the surfaces of metal powder particles with Ag is used. In addition, a substance obtained by subjecting Cu to an oxidation preventing treatment is also able to be used. The reason for using a metal coated with Ag is to make it possible to reduce the cost of the base metal while still retaining the characteristics of Ag.

The metal included in the resin electrode layers 28 is preferably included at around 35-75% by volume with respect to the entire volume of the resin electrodes, for example. The metal included in the resin electrode layers 28 is included as an electrically conductive filler (metal powder). The shape of the particles of the electrically conductive filler is not particularly limited. The particles of the electrically conductive filler may have a substantially spherical or flat shape, for example, but it is preferable that a substance containing a mixture of substantially spherical metal powder particles and substantially flat metal powder particles be used. The average particle diameter of the electrically conductive filler included in the resin electrode layers 28 may be around 0.3-10.0 µm, for example, but is not particularly limited. The electrically conductive filler included in the resin electrode layers 28 is mainly responsible for the electrical conductivity of the resin electrode layers 28. Specifically, electrically conductive paths are provided inside the resin electrode layers 28 as a result of the electrically conductive filler particles contacting each other. The leading ends of the resin electrode layers 28 preferably extend around 50-800 µm from the leading ends of the base electrode layers 26, for example. As a result, a surface area is able to be sufficiently obtained for the resin electrode layers that reduce stress that occurs at the time of a thermal shock cycle, a solder cracking alleviating effect is able to be obtained.

The resin layers 30 include a first resin layer 30a and a second resin layer 30b.

The first resin layer 30a is located at least between the first base electrode layer 26a and the first resin electrode layer 28a in a region that is located on the second main surface 12b side of the first end surface 12e relative to the center portion of the first end surface 12e. Specifically, the first resin layer 30a is provided on the surface of the portion of the first base electrode layer 26a located on the second main surface 12b, the surface of the portion of the first base electrode layer 26a located on the second main surface 12b side of the first end surface 12e relative to the center portion of the first end surface 12e, the surface of the portion of the first base electrode layer 26a located on the second main surface 12b side of the first side surface 12c relative to the center portion of the first side surface 12c, and the surface of the portion of the first base electrode layer 26a located on the second main surface 12b side of the second side surface 12d relative to the center portion of the second side surface 12d. Therefore, the first resin layer 30a extends from the first end surface 12e onto the first side surface 12c, the second side surface 12d, and the second main surface 12b.

The second resin layer 30b is located at least between the second base electrode layer 26b and the second resin electrode layer 28b in a region that is located on the second main surface 12b side of the second end surface 12f relative to the center portion of the second end surface 12f. Specifically, the second resin layer 30b is located on the surface of the portion of the second base electrode layer 26b located on the second main surface 12b, the surface of the portion of the second base electrode layer 26b located on the second main surface 12b side of the second end surface 12f relative to the center portion of the second end surface 12f, the surface of the portion of the second base electrode layer 26b located on the second main surface 12b side of the first side surface 12c relative to the center portion of the first side surface 12c, and the surface of the portion of the second base electrode layer 26b located on the second main surface 12b side of the second side surface 12d relative to the center portion of the second side surface 12d. Therefore, the second resin layer 30b extends from the second end surface 12f onto the first side surface 12c, the second side surface 12d, and the second main surface 12b.

Furthermore, the first resin layer 30a is provided so as to completely cover a leading end portion of the first base electrode layer 26a that is provided on the second main surface 12b, and the second resin layer 30b is provided so as to completely cover a leading end portion of the second base electrode layer 26b that is provided on the second main surface 12b. Thus, the resin layers 30 are provided between the resin electrode layers 28 and the base electrode layers 26 on the mounting surface side, and therefore the surfaces of the base electrode layers 26 are able to be covered with certainty by the resin layers 30. Therefore, design assurance of mechanical strength is able to be easily achieved without consideration of the control method used when forming the resin electrode layers 28 and the accuracy.

The first resin electrode layer 28a is provided so as to cover the first resin layer 30a. In addition, the second resin electrode layer 28b is provided so as to cover the second resin layer 30b.

It is preferable that the combined thickness of the first resin layer 30a that covers the portions of the first base electrode layer 26a located on the second main surface 12b, the first side surface 12c, and the second side surface 12d and the corresponding portions of the first resin electrode layer 28a located on the surface of the first resin layer 30a that covers the first base electrode layer 26a located on the second main surface 12b, the first side surface 12c, and the second side surface 12d be identical or substantially identical to the thickness of the portion of the first resin electrode layer 28a that is directly provided on the surface of the first base electrode layer 26a located on first end surface 12e. Similarly, it is preferable that the combined thickness of the second resin layer 30b that covers the portions of the second base electrode layer 26b located on second main surface 12b, the first side surface 12c, and the second side surface 12d and the corresponding portions of the second resin electrode layer 28b located on the surface of the second resin layer 30b that covers the second base electrode layer 26b located on the second main surface 12b, the first side surface 12c, and the second side surface 12d be identical or substantially identical to the thickness of the portion of the second resin electrode layer 28b that is directly provided on the surface of the second base electrode layer 26b located on second end surface 12f.

The thickness of the first resin layer 30a is not particularly limited, but, for example, is preferably around 3-10 μm in the portion that is located between the first base electrode layer 26a and the first resin electrode layer 28a and is preferably around 3-10 μm in the portion that is located on the multilayer body 12, for example. The thickness of the second resin layer 30b is also not particularly limited, but, for example, is preferably around 3-10 μm in the portion that is located between the second base electrode layer 26b and the second resin electrode layer 28b and is preferably around 3-10 μm in the portion that is located on the multilayer body 12, for example.

The position (height) at which an end portion of the first resin layer 30a is provided on the first end surface 12e is preferably around 1/10-1/5 a dimension T of the multilayer ceramic capacitor 10 in the height direction x from the bottom surface (mounting surface) of the multilayer ceramic capacitor 10, for example. In addition, the position (height) at which an end portion of the second resin layer 30b is provided on the second end surface 12f is preferably around 1/10-1/5 of a dimension T of the multilayer ceramic capacitor 10 in the height direction x from the bottom surface (mounting surface) of the multilayer ceramic capacitor 10, for example. As a result, an effect of improving mechanical strength is able to be secured and a high quality electrical connection is able to be realized.

The resin layers 30 have an insulating property and do not contain an electrically conductive component. Specifically, it is preferable that the resin layers 30 do not contain a metal component. As a result, the resin layers 30 can have high elasticity. Therefore, when a dropping impact occurs or bending stress resulting from bending of the mounting substrate is generated, the stress is absorbed with more certainty, and the occurrence of a situation in which cracks are generated in the multilayer ceramic capacitor 10 is reduced or prevented.

For example, any of various known thermosetting resins such as an epoxy resin, a phenol resin, a urethane resin, a silicone resin, and a polyimide resin can be used as the resin used in the resin layers 30. Among these resins, it is preferable that an epoxy resin, which is excellent in terms of heat resistance, moisture resistance, adhesiveness, and so on, be used.

The plating layers 32 include a first plating layer 32a and a second plating layer 32b.

The first plating layer 32a is provided so as to cover the first resin electrode layer 28a. Specifically, the first plating layer 32a is provided on the surface of the portion of the first resin electrode layer 28a that is located on the first end surface 12e, and is preferably provided so as to also extend across the surfaces of the portions of the first resin electrode layer 28a that are located on the first main surface 12a, the second main surface 12b, the first side surface 12c, and the second side surface 12d.

The second plating layer 32b is provided so as to cover the second resin electrode layer 28b. Specifically, the second plating layer 32b is provided on the surface of the portion of the second resin electrode layer 28b that is located on the second end surface 12f, and is preferably provided so as to also extend across the surfaces of the portions of the second resin electrode layer 28b that are located on the first main surface 12a, the second main surface 12b, the first side surface 12c, and the second side surface 12d.

The plating layers 32 include at least one selected from among Cu, Ni, Sn, Ag, Pd, an Ag—Pd alloy, Au, and the like. The plating layers 32 may include a plurality of layers. The plating layers 32 preferably have a two-layer structure including a Ni plating layer and a Sn plating layer. As a result of providing the plating layers including Ni plating (Ni plating layers) so as to cover the resin electrode layers 28, corrosion of the resin electrode layers 28 and the underlying base electrode layers 26 by solder used in the mounting process when mounting the multilayer ceramic capacitor 10 is prevented. In addition, as a result of further providing the plating layers composed of Sn plating (Sn plating layers) on the surfaces of the plating layers including Ni plating, the wettability of the solder used in the mounting process is able to be improved when mounting the multilayer ceramic capacitor 10, and the multilayer ceramic capacitor 10 is more easily mounted.

The thickness of each plating layer 32 is preferably around 1-15 μm, for example.

The plating layers 32 are provided as required or desired.

A dimension L represents a dimension in the length direction z of the multilayer ceramic capacitor 10 including the multilayer body 12, the first outer electrode 24a, and the second outer electrode 24b, a dimension T represents dimension in the height direction x of the multilayer ceramic capacitor 10 including the multilayer body 12, the first outer electrode 24a, and the second outer electrode 24b, and a dimension W represents a dimension in the width direction y of the multilayer ceramic capacitor 10 including the multilayer body 12, the first outer electrode 24a, and the second outer electrode 24b.

The multilayer ceramic capacitor 10 preferably has a dimension L in the length direction z of around 0.250-0.600 mm, a dimension W in the width direction y of around 0.125-0.300 mm, and a dimension T in the height direction x of around 0.125-0.300 mm, for example.

In the multilayer ceramic capacitor 10 illustrated in FIG. 1, since the resin layers 30 are provided between the resin electrode layers 28 and the base electrode layers 26 in the outer electrodes 24, the surfaces of the base electrode layers 26 are able to be covered by the resin layers 30 with more certainty. Therefore, the leading end portions of the base electrode layers 26 are also able to be covered by the resin layers 30 without consideration of the control method used when forming the resin electrode layers 28 and the accuracy.

In addition, since the resin layers 30 do not contain a metal component, the resin layers 30 have higher elasticity. Therefore, when a dropping impact occurs or bending stress resulting from bending of the mounting substrate is generated, the stress is able to be absorbed with more certainty, and the occurrence of a situation in which cracks are generated in the multilayer body is reduced or prevented.

From the above description, according to the multilayer ceramic capacitor 10 illustrated in FIG. 1, a highly reliable multilayer ceramic capacitor is provided for which design assurance of mechanical strength is easily achieved.

In addition, in the multilayer ceramic capacitor 10 illustrated in FIG. 1, the first resin electrode layer 28a directly covers the first base electrode layer 26a in a region located on the first main surface 12a side of the first end surface 12e relative to the center portion of the first end surface 12e and the second resin electrode layer 28b directly covers the second base electrode layer 26b in a region located on the first main surface 12a side of the second end surface 12f relative to the center portion of the second end surface 12f, and therefore stress generated when a dropping impact occurs or bending stress caused by bending of the mounting substrate is able to be absorbed.

In addition, in the multilayer ceramic capacitor 10 illustrated in FIG. 1, when the total thickness of the first resin layer 30a that covers the portions of the first base electrode layer 26a located on the second main surface 12b, the first side surface 12c, and the second side surface 12d and the corresponding portions of the first resin electrode layer 28a located on the surface of the first resin layer 30a that covers the first base electrode layer 26a located on the second main surface 12b, the first side surface 12c, and the second side surface 12d is substantially identical to the thickness of the portion of the first resin electrode layer 28a that is directly provided on the surface of the first base electrode layer 26a located on first end surface 12e, and the total thickness of the second resin layer 30b that covers the portions of the second base electrode layer 26b located on second main surface 12b, the first side surface 12c, and the second side surface 12d and the corresponding portions of the second resin electrode layer 28b located on the surface of the second resin layer 30b that covers the second base electrode layer 26b located on the second main surface 12b, the first side surface 12c, and the second side surface 12d is substantially identical to the thickness of the portion of the second resin electrode layer 28b that is directly provided on the surface of the second base electrode layer 26b located on second end surface 12f, the above-described effects achieved by various preferred embodiments of the present invention are able to be obtained while maintaining the product dimensions of the multilayer ceramic capacitor 10.

Figure 5:
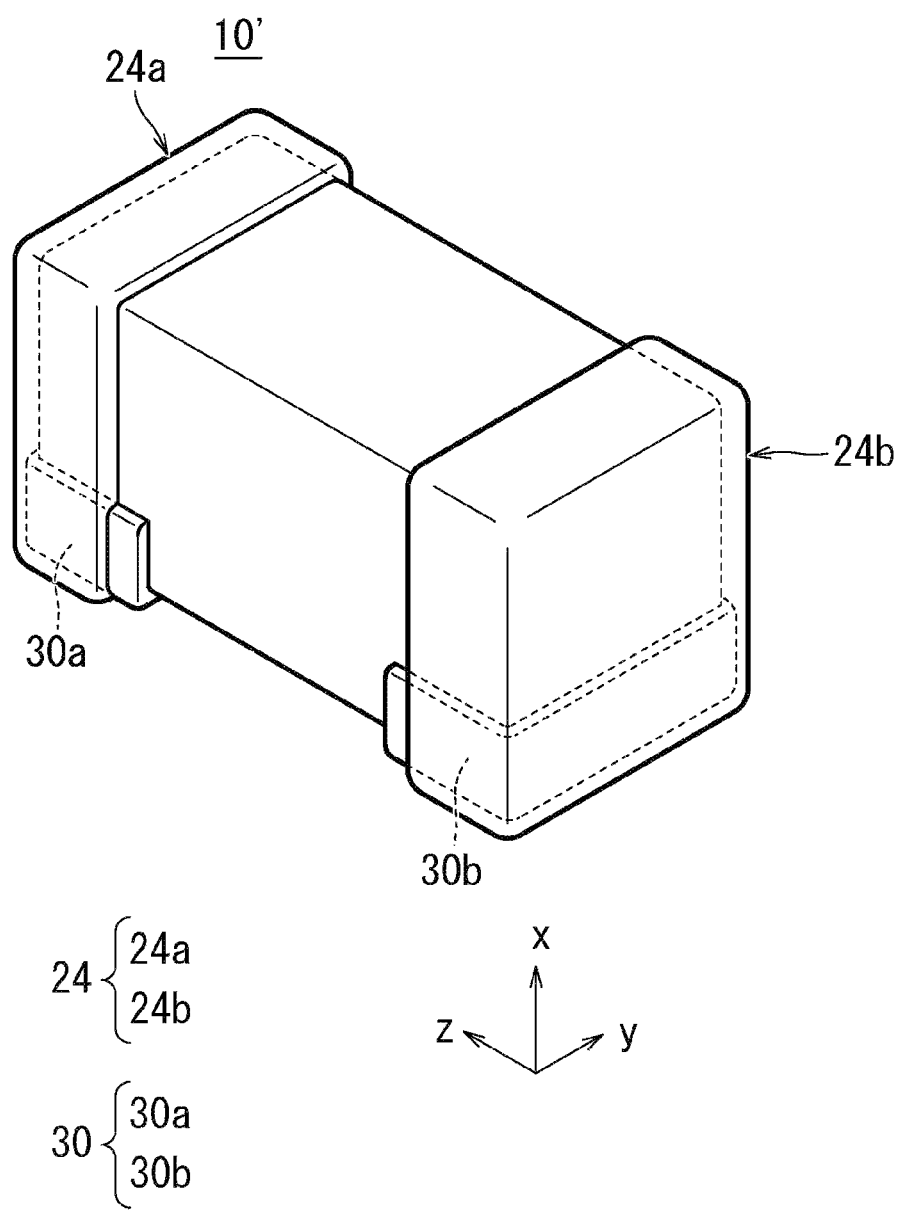
FIG. 5 is an external perspective view illustrating a multilayer ceramic capacitor according to a first modification of the first preferred embodiment of the present invention.

Next, a multilayer ceramic capacitor according to a first modification of the first preferred embodiment of the present invention will be described. FIG. 5 is an external perspective view illustrating the multilayer ceramic capacitor according to the first modification of the first preferred embodiment of the present invention. A multilayer ceramic capacitor 10' according to this preferred embodiment has substantially the same configuration as the multilayer ceramic capacitor 10 described using FIG. 1 except that the resin layers of the outer electrodes are arranged in a different manner. In addition, sectional views of the multilayer ceramic capacitor 10' according to this modification are the same as those in FIGS. 2 to 4 illustrating the multilayer ceramic capacitor 10 according to the first preferred embodiment and are therefore omitted.

In the multilayer ceramic capacitor 10' according to the first modification of the first preferred embodiment of the present invention, the first resin layer 30a is provided so as to cover the first base electrode layer 26a in a region located on the second main surface 12b side, and the second resin layer 30b is provided so as to cover the second base electrode layer 26b in a region located on the second main surface 12b side. In addition, as illustrated in FIG. 5, in contrast to the multilayer ceramic capacitor 10 illustrated in FIG. 1, the first resin layer 30a and the second resin layer 30b are not connected to each other on the first side surface 12c at the second main surface 12b side, and similarly are not connected to each other on the second side surface 12d at the second main surface 12b side. Therefore, a gap having the same length as a gap in the L direction between the first resin layer 30a and the second resin layer 30b located on the second main surface 12b side is also provided on the first side surface 12c at the second main surface 12b side and on the second side surface 12d at the second main surface 12b side.

Figure 6:
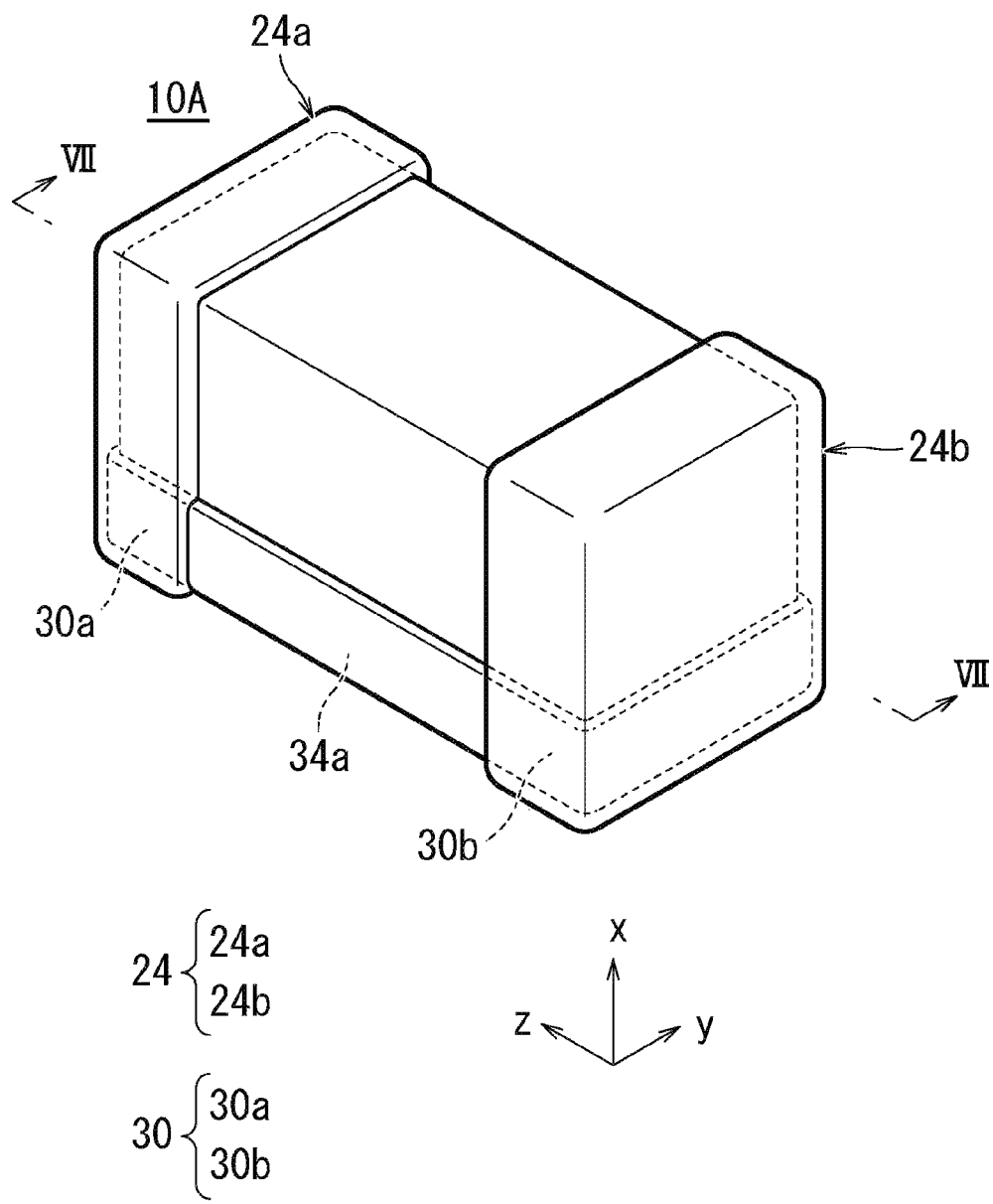
FIG. 6 is an external perspective view illustrating an example of a multilayer ceramic capacitor according to a second modification of the first preferred embodiment of the present invention.
Figure 7:
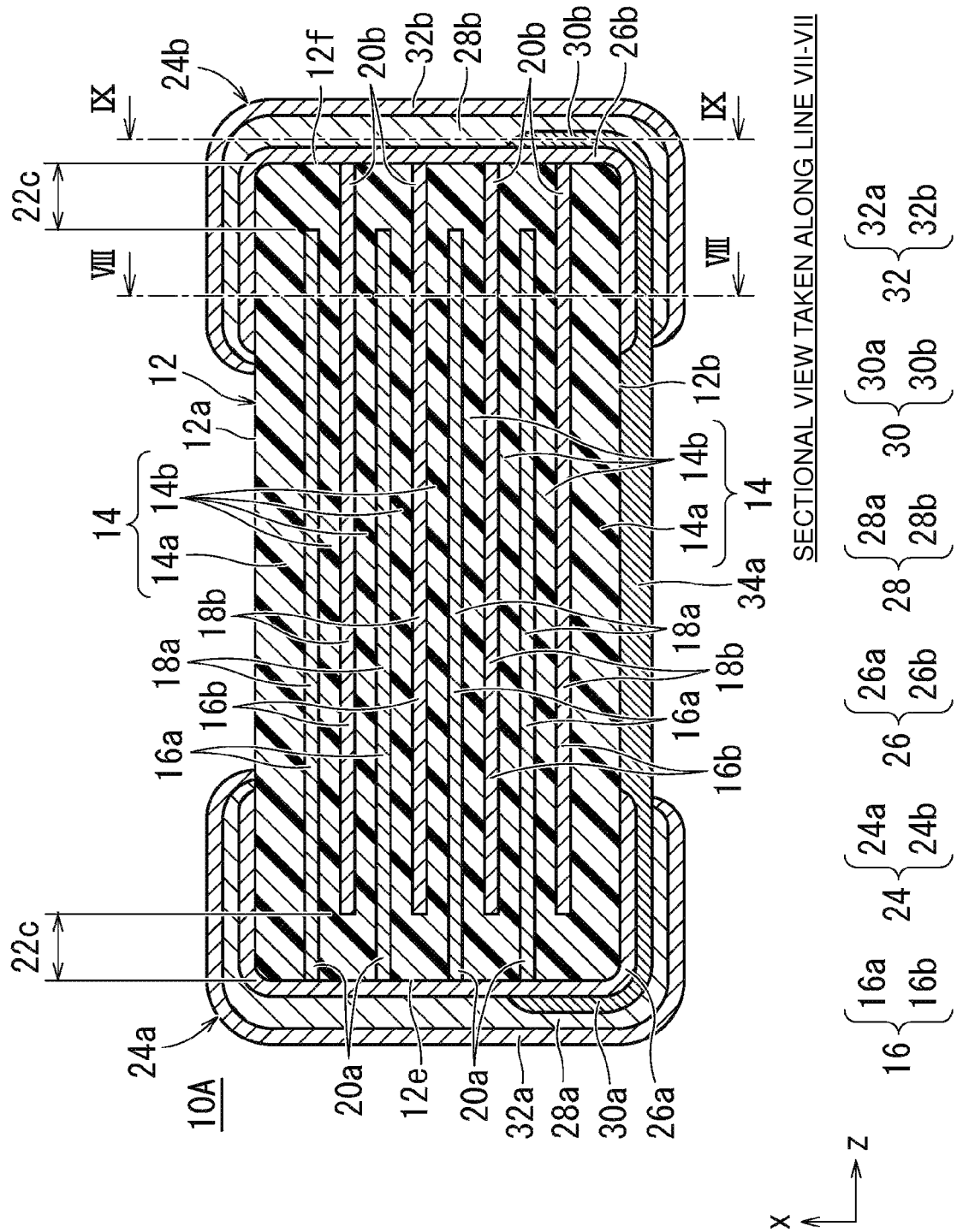
FIG. 7 is a sectional view that is taken along line VII-VII in FIG. 6 and illustrates the multilayer ceramic capacitor according to the second modification of the first preferred embodiment of the present invention.

Next, a multilayer ceramic capacitor according to a second modification of the first preferred embodiment of the present invention will be described. FIG. 6 is an external perspective view illustrating an example of a multilayer ceramic capacitor according to the second modification of the first preferred embodiment of the present invention. FIG. 7 is a sectional view taken along line VII-VII in FIG. 6 and illustrates the multilayer ceramic capacitor according to the second modification of the first preferred embodiment of the present invention, FIG. 8 is a sectional view taken along line VIII-VIII in FIG. 7 and illustrates the multilayer ceramic capacitor according to the second modification of the first preferred embodiment of the present invention, and FIG. 9 is a sectional view taken along line IX-IX in FIG. 7 and illustrates the multilayer ceramic capacitor according to the second modification of the first preferred embodiment of the present invention. A multilayer ceramic capacitor 10A according to this preferred embodiment has substantially the same configuration as the multilayer ceramic capacitor 10 described using FIG. 1 except that the resin layers of the outer electrodes are arranged in a different manner. Therefore, the portions that are the same as in the multilayer ceramic capacitor 10 illustrated in FIG. 1 are denoted by the same symbols and description thereof is omitted.

The resin layers 30 of the multilayer ceramic capacitor 10A include the first resin layer 30a and the second resin layer 30b. The way in which the first resin layer 30a and the second resin layer 30b are provided is the same as in the multilayer ceramic capacitor 10 and therefore description thereof is omitted.

A first covering portion 34a is located between the first resin layer 30a and the second resin layer 30b on the second main surface 12b so as to cover a region where the base electrode layers 26 are not located (region where surface of multilayer body 12 is exposed). That is, in the multilayer ceramic capacitor 10A, the first resin layer 30a, the second resin layer 30b, and the first covering portion 34a are structured and formed in an integrated manner, and arranged at prescribed positions. In addition, the material of the first covering portion 34a is the same as that of the resin layers 30.

According to the multilayer ceramic capacitor 10A illustrated in FIG. 6, the same effects as with the multilayer ceramic capacitor 10 illustrated in FIG. 1 are realized, and the following effect is also realized.

That is, in the process of manufacturing the multilayer ceramic capacitor 10A as described later, there is no need to perform masking in order to cause portion of the second main surface 12b to be exposed, and therefore the resin layers 30 are easily formed.

Figure 10:
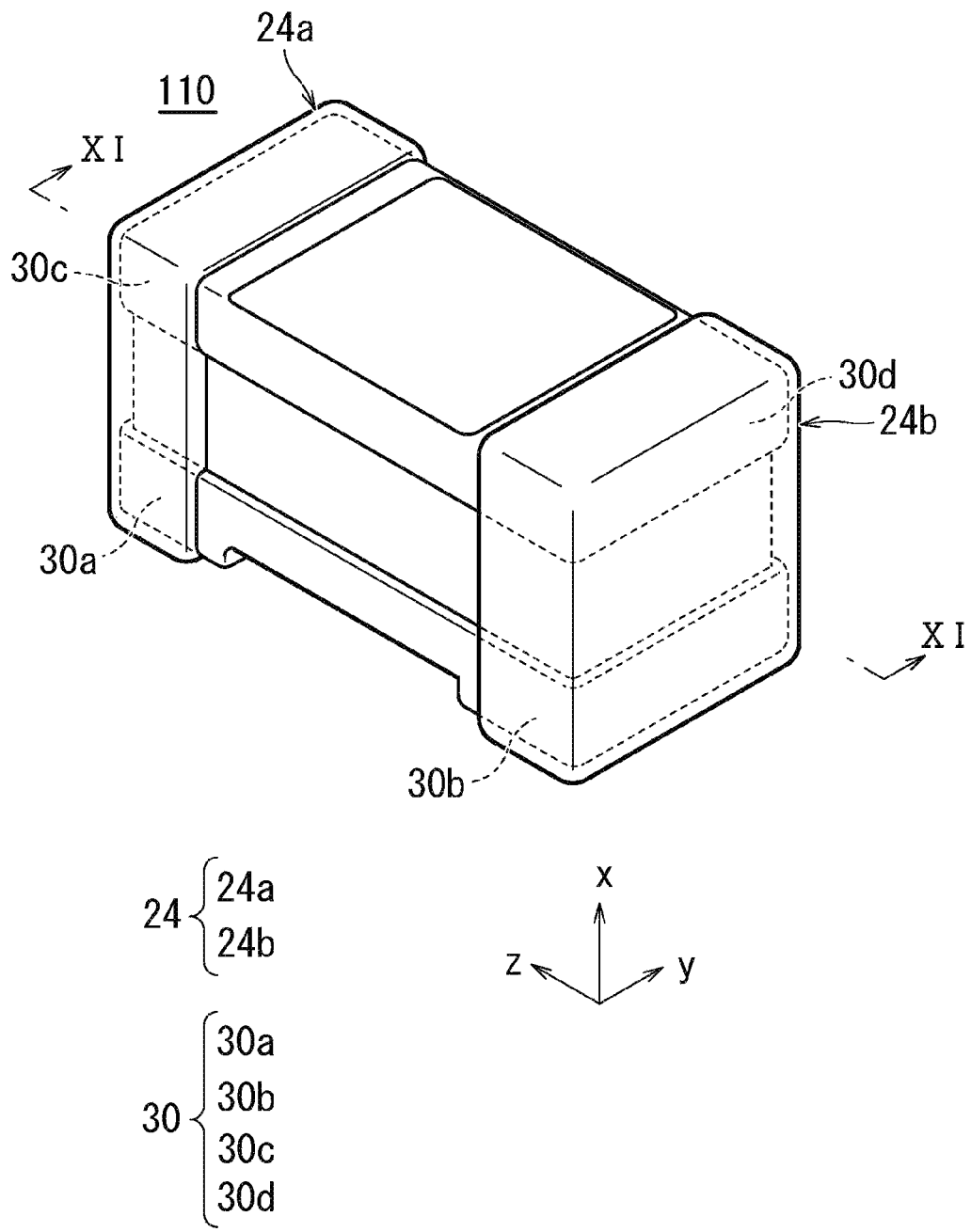
FIG. 10 is an external perspective view illustrating an example of a multilayer ceramic capacitor according to a second preferred embodiment of the present invention.
Figure 11:
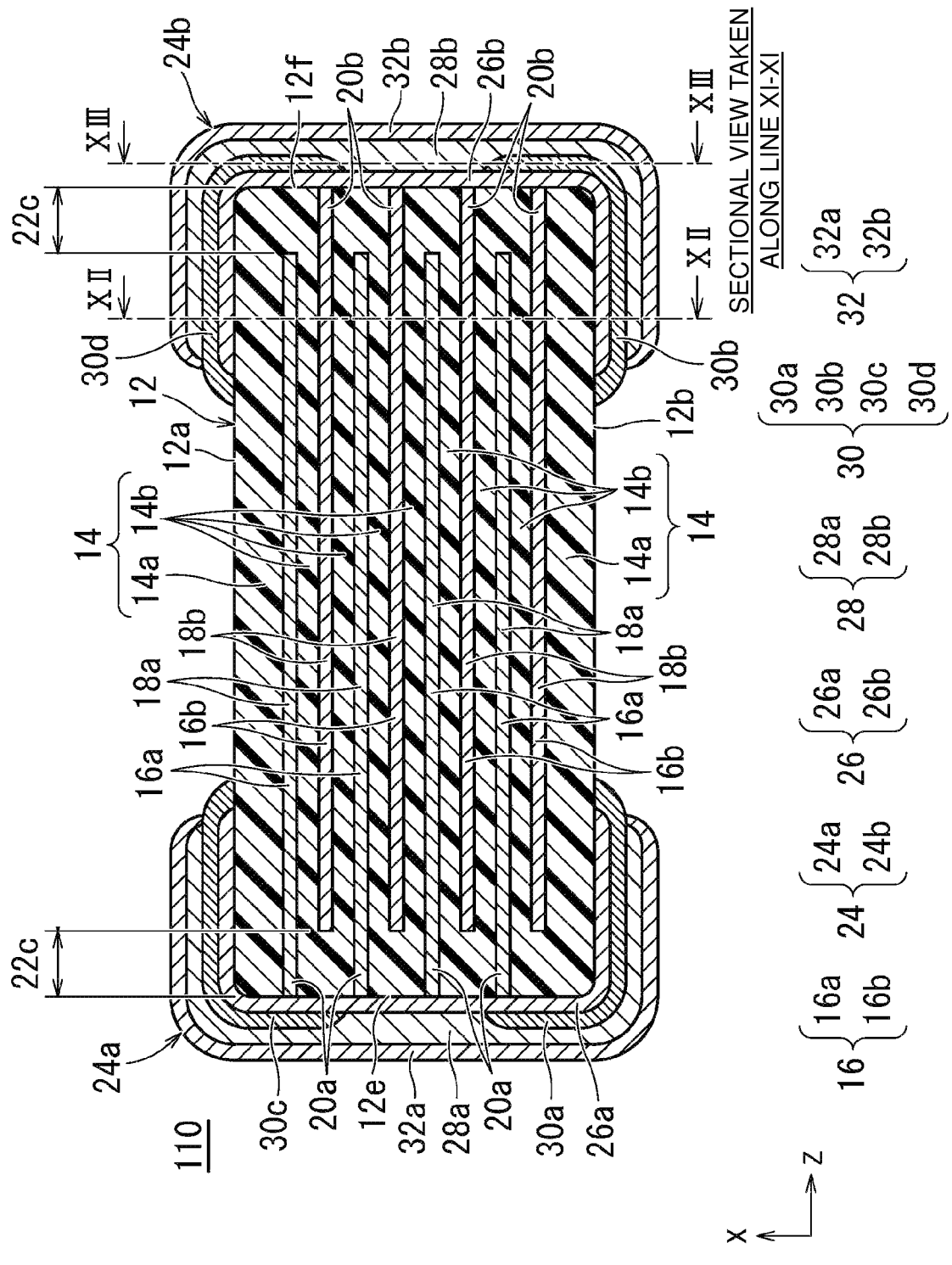
FIG. 11 is a sectional view that is taken along line XI-XI in FIG. 10 and illustrates the multilayer ceramic capacitor according to the second preferred embodiment of the present invention.
Figure 12:
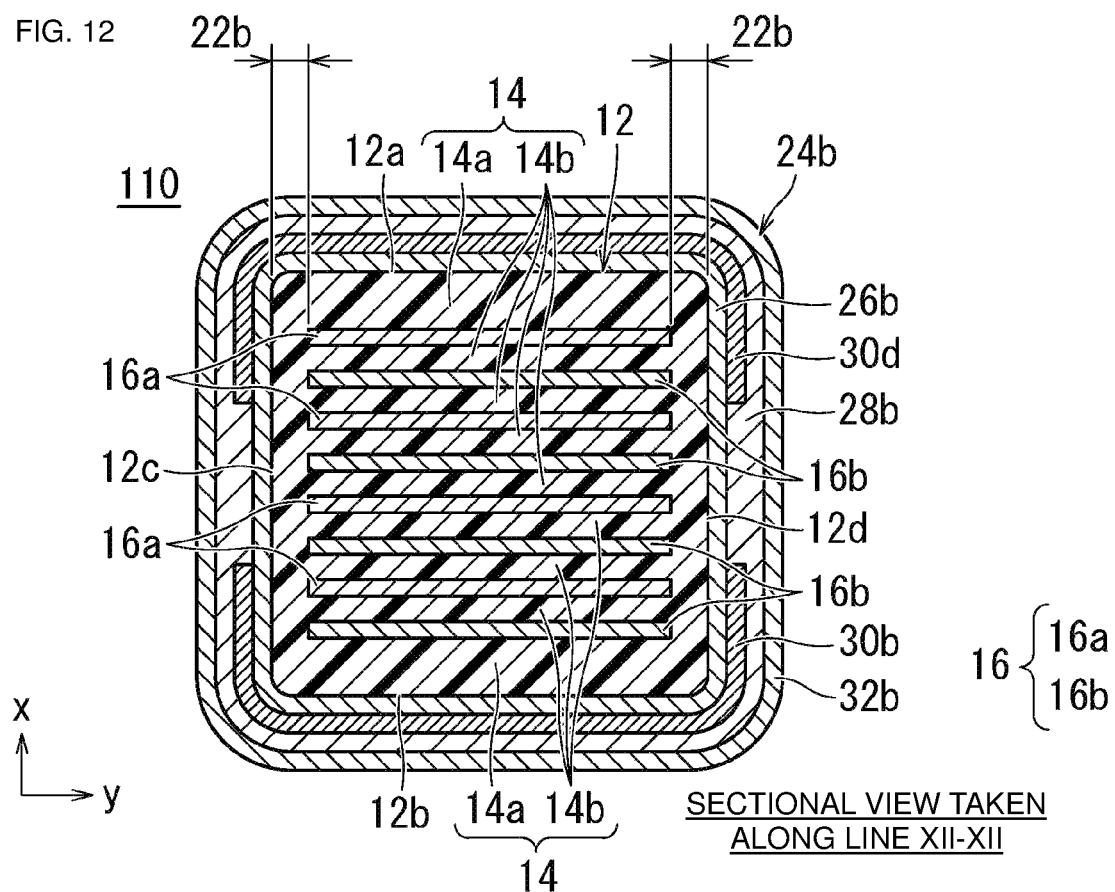
FIG. 12 is a sectional view that is taken along line XII-XII in FIG. 11 and illustrates the multilayer ceramic capacitor according to the second preferred embodiment of the present invention.
Figure 13:
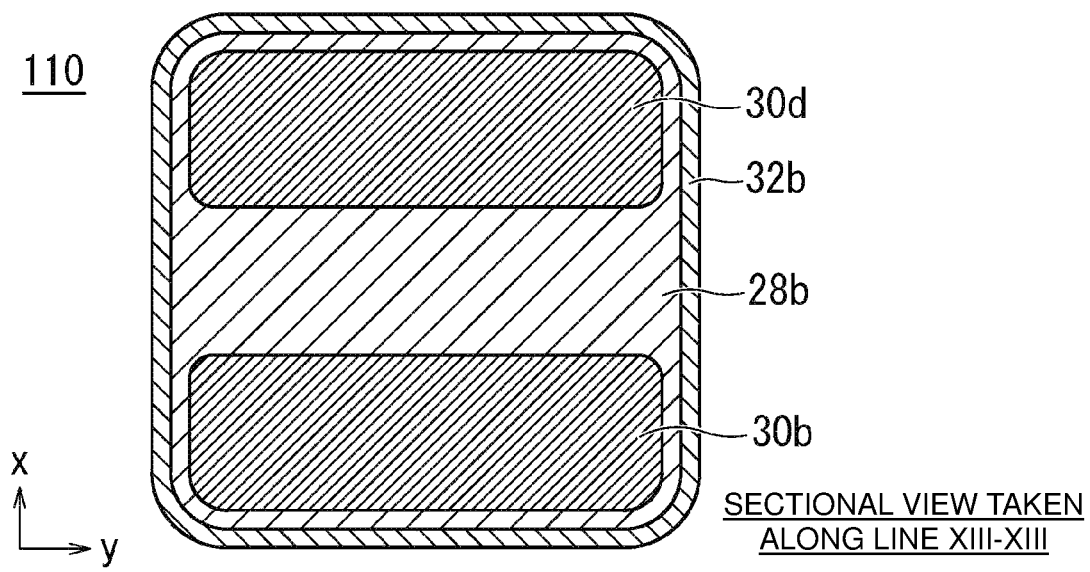
FIG. 13 is a sectional view that is taken along line XIII-XIII in FIG. 11 and illustrates the multilayer ceramic capacitor according to the second preferred embodiment of the present invention.

Next, a multilayer ceramic capacitor according to a second preferred embodiment of the present invention will be described. FIG. 10 is an external perspective view illustrating an example of a multilayer ceramic capacitor according to the second preferred embodiment of the present invention. FIG. 11 is a sectional view that is taken along line XI-XI in FIG. 10 and illustrates the multilayer ceramic capacitor according to the second preferred embodiment of the present invention, FIG. 12 is a sectional view that is taken along line XII-XII in FIG. 11 and illustrates the multilayer ceramic capacitor according to the second preferred embodiment of the present invention, and FIG. 13 is a sectional view that is taken along line XIII-XIII in FIG. 11 and illustrates the multilayer ceramic capacitor according to the second preferred embodiment of the present invention. A multilayer ceramic capacitor 110 according to this preferred embodiment has substantially the same configuration as the multilayer ceramic capacitor 10 described using FIG. 1 except that the resin layers of the outer electrodes are arranged in a different manner. Therefore, the portions that are the same as in the multilayer ceramic capacitor 10 illustrated in FIG. 1 are denoted by the same symbols and description thereof is omitted.

The resin layers 30 of the multilayer ceramic capacitor 110 include the first resin layer 30a, the second resin layer 30b, a third resin layer 30c, and a fourth resin layer 30d. The way in which the first resin layer 30a and the second resin layer 30b are structured is the same as in the multilayer ceramic capacitor 10 and therefore description thereof is omitted.

The third resin layer 30c is provided at least between the first base electrode layer 26a and the first resin electrode layer 28a in a region located on the first main surface 12a side of the first end surface 12e relative to the center portion of the first end surface 12e. Specifically, the third resin layer 30c is provided on the surface of the portion of the first base electrode layer 26a located on the first main surface 12a, the surface of the portion of the first base electrode layer 26a located on the first main surface 12a side of the first end surface 12e relative to the center portion of the first end surface 12e, the surface of the portion of the first base electrode layer 26a located on the first main surface 12a side of the first side surface 12c relative to the center portion of the first side surface 12c, and the surface of the portion of the first base electrode layer 26a located on the first main surface 12a side of the second side surface 12d relative to the center portion of the second side surface 12d. Therefore, the third resin layer 30c is provided so as to extend from the first end surface 12e onto the first side surface 12c, the second side surface 12d, and the first main surface 12a.

The fourth resin layer 30d is provided at least between the second base electrode layer 26b and the second resin electrode layer 28b in a region that is located on the first main surface 12a side of the second end surface 12f relative to the center portion of the second end surface 12f. Specifically, the fourth resin layer 30d is provided on the surface of the portion of the second base electrode layer 26b located on the first main surface 12a, the surface of the portion of the second base electrode layer 26b located on the first main surface 12a side of the second end surface 12f relative to the center portion of the second end surface 12f, the surface of the portion of the second base electrode layer 26b located on the first main surface 12a side of the first side surface 12c relative to the center portion of the first side surface 12c, and the surface of the portion of the second base electrode layer 26b located on the first main surface 12a side of the second side surface 12d relative to the center portion of the second side surface 12d. Therefore, the fourth resin layer 30d is provided so as to extend from the second end surface 12f onto the first side surface 12c, the second side surface 12d, and the first main surface 12a.

In addition, the third resin layer 30c and the fourth resin layer 30d are connected to each other on the first side surface 12c at the first main surface 12a side, and similarly, are connected to each other on the second side surface 12d at the first main surface 12a side, but the third resin layer 30c and the fourth resin layer 30d do not necessarily have to be connected to each other on both these side surfaces.

According to the multilayer ceramic capacitor 110 illustrated in FIG. 10, the same effects as with the multilayer ceramic capacitor 10 illustrated in FIG. 1 are realized, and the following effect is also realized.

That is, since the resin layers 30 are also provided on the first main surface 12a side, the multilayer ceramic capacitor is able to be mounted on a substrate using either the first main surface 12a or the second main surface 12b, and there is no need to determine the mounting direction of the multilayer ceramic capacitor when taping the multilayer ceramic capacitor (that is, when storing the multilayer ceramic capacitor in a tape molded to have recessed portions). This is particularly advantageous for a multilayer ceramic capacitor in which the T dimension of the multilayer ceramic capacitor is larger than the W dimension of the multilayer ceramic capacitor.

Figure 14:
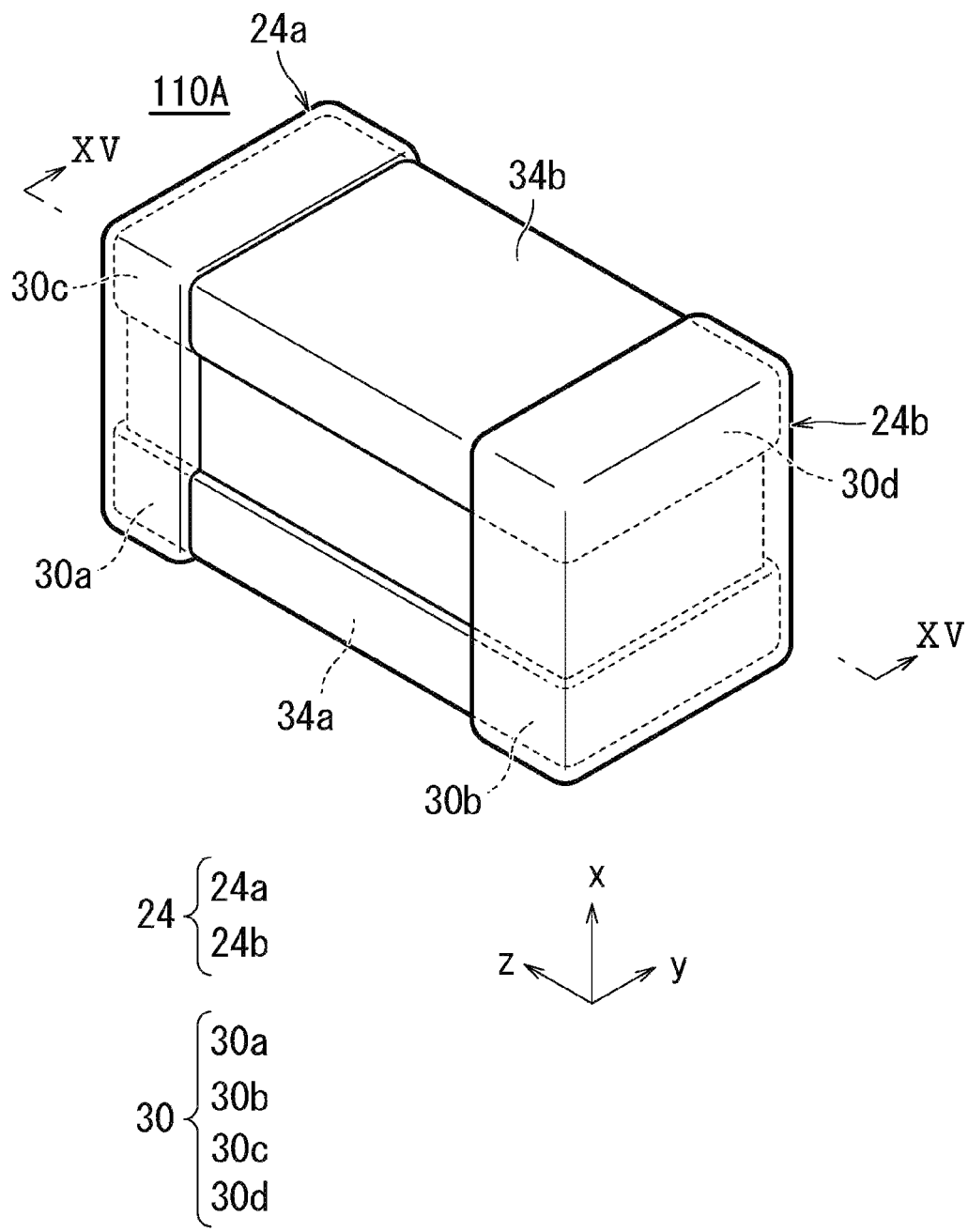
FIG. 14 is an external perspective view illustrating an example of a multilayer ceramic capacitor according to a modification of the second preferred embodiment of the present invention.
Figure 15:
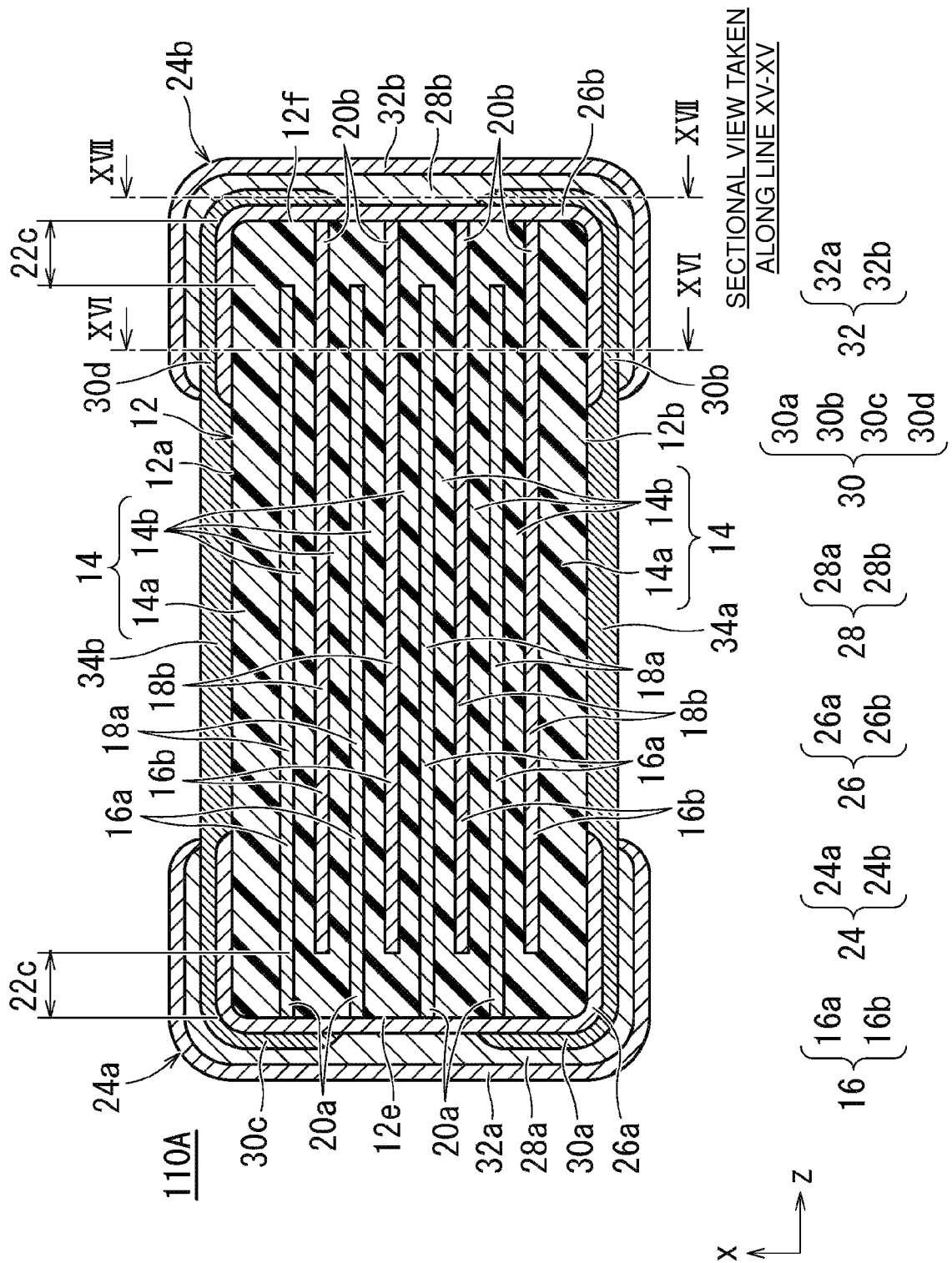
FIG. 15 is a sectional view that is taken along line XV-XV in FIG. 14 and illustrates the multilayer ceramic capacitor according to the modification of the second preferred embodiment of the present invention.
Figure 16:
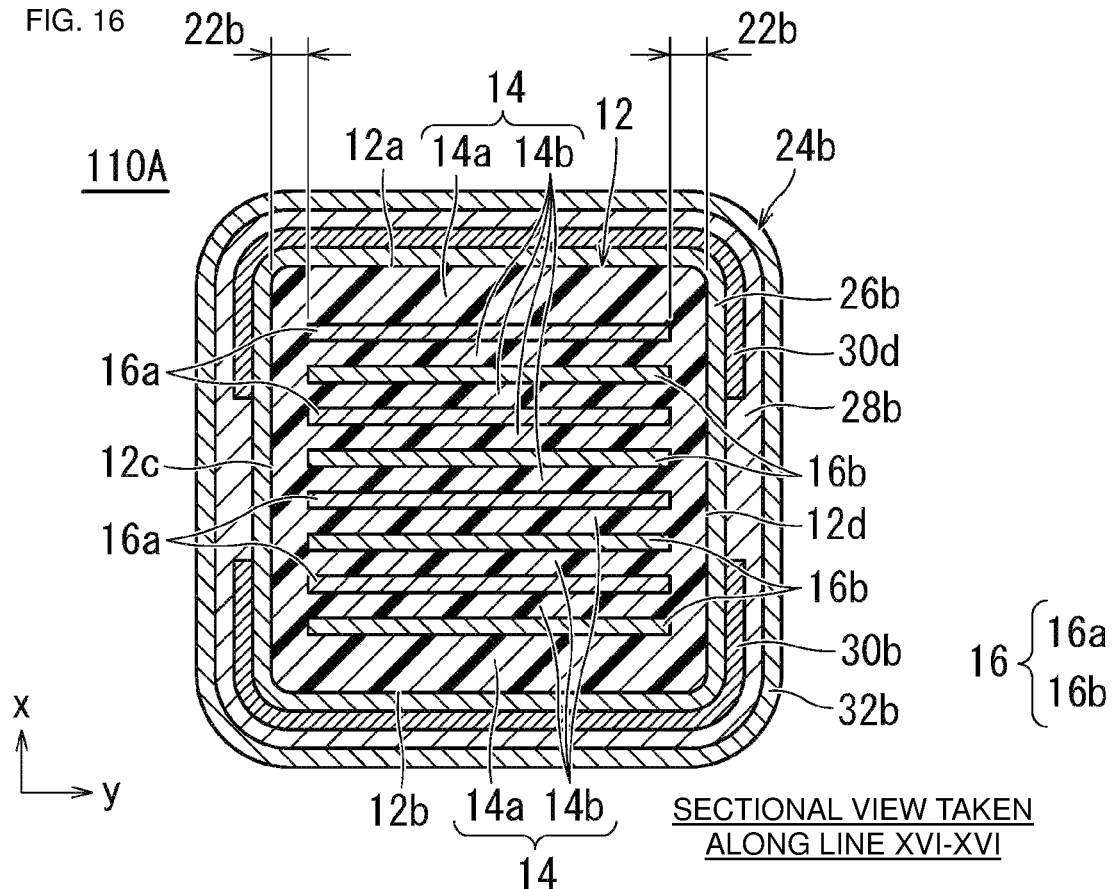
FIG. 16 is a sectional view that is taken along line XVI-XVI in FIG. 15 and illustrates the multilayer ceramic capacitor according to the modification of the second preferred embodiment of the present invention.
Figure 17:
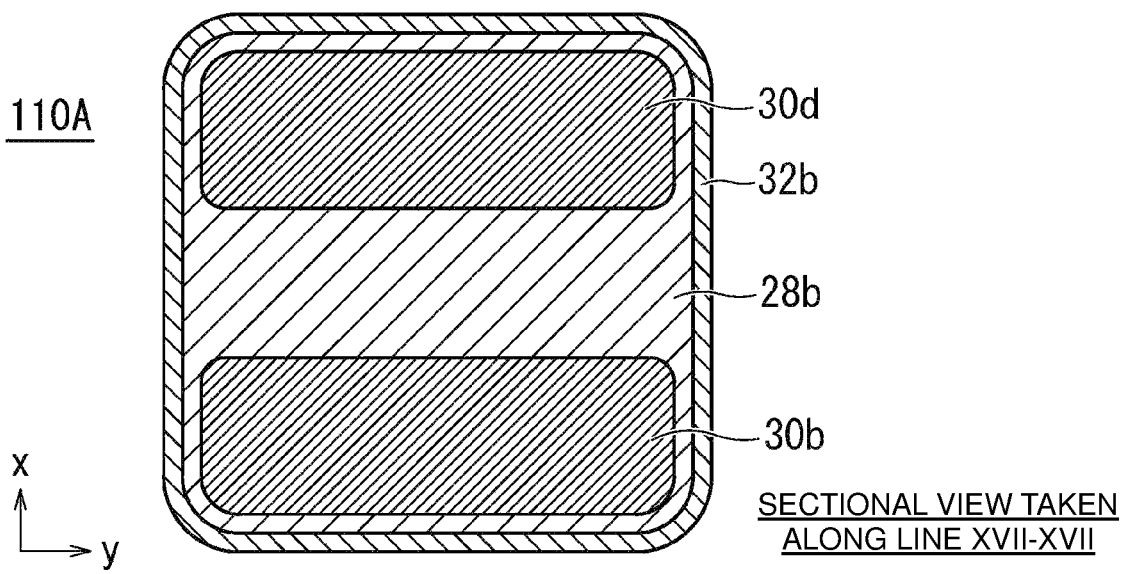
FIG. 17 is a sectional view that is taken along line XVII-XVII in FIG. 15 and illustrates the multilayer ceramic capacitor according to the modification of the second preferred embodiment of the present invention.

Next, a multilayer ceramic capacitor according to a modification of the second preferred embodiment of the present invention will be described. FIG. 14 is an external perspective view illustrating an example of a multilayer ceramic capacitor according to the modification of the second preferred embodiment of the present invention. FIG. 15 is a sectional view taken along line XV-XV in FIG. 14 and illustrates the multilayer ceramic capacitor according to the modification of the second preferred embodiment of the present invention, FIG. 16 is a sectional view taken along line XVI-XVI in FIG. 15 and illustrates the multilayer ceramic capacitor according to the modification of the second preferred embodiment of the present invention, and FIG. 17 is a sectional view taken along line XVII-XVII in FIG. 15 and illustrates the multilayer ceramic capacitor according to the modification of the second preferred embodiment of the present invention. A multilayer ceramic capacitor 110A according to this preferred embodiment has substantially the same configuration as the multilayer ceramic capacitor 10 described using FIG. 1 except that the resin layers of the outer electrodes are arranged in a different manner. Therefore, the portions that are the same as in the multilayer ceramic capacitor 10 illustrated in FIG. 1 are denoted by the same symbols and description thereof is omitted.

The resin layers 30 of the multilayer ceramic capacitor 110A include the first resin layer 30a, the second resin layer 30b, the third resin layer 30c, and the fourth resin layer 30d. The way in which the first resin layer 30a, the second resin layer 30b, the third resin layer 30c, and the fourth resin layer 30d are provided is the same as the multilayer ceramic capacitor 110, and therefore description thereof is omitted.

The first covering portion 34a is located between the first resin layer 30a and the second resin layer 30b on the second main surface 12b so as to cover a region where the resin layers 30 are not located (region where surface of multilayer body 12 is exposed). That is, in the multilayer ceramic capacitor 110A, the first resin layer 30a, the second resin layer 30b, and the first covering portion 34a are provided so as to be integrated with each other. In addition, a second covering portion 34b is located between the third resin layer 30c and the fourth resin layer 30d on the first main surface 12a so as to cover a region where the resin layers 30 are not located (region where surface of multilayer body 12 is exposed). That is, in the multilayer ceramic capacitor 110A, the third resin layer 30c, the fourth resin layer 30d, and the second covering portion 34b are provided so as to be integrated with each other. In addition, the material of the first covering portion 34a and the second covering portion 34b is the same as that of the resin layers 30.

According to the multilayer ceramic capacitor 110A illustrated in FIG. 14, the same effects as with the multilayer ceramic capacitor 110 illustrated in FIG. 10 are realized, and the following effect is also realized.

That is, in the process of manufacturing the multilayer ceramic capacitor 110A, there is no need to perform masking in order to cause portion of the first main surface 12a and portion of the second main surface 12b to be exposed, and therefore the resin layers 30 are easily formed.

Figure 18:
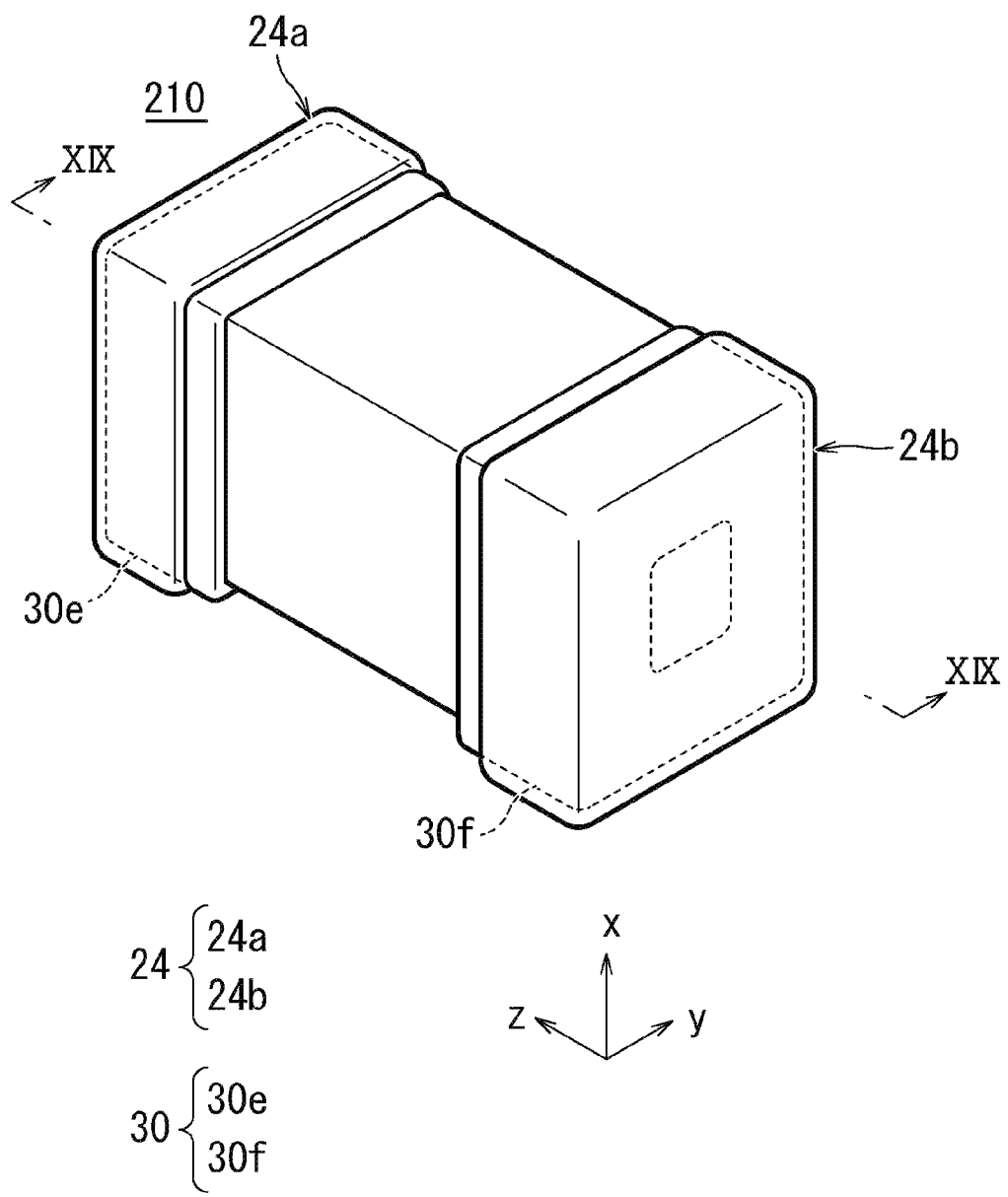
FIG. 18 is an external perspective view illustrating an example of a multilayer ceramic capacitor according to a third preferred embodiment of the present invention.
Figure 19:
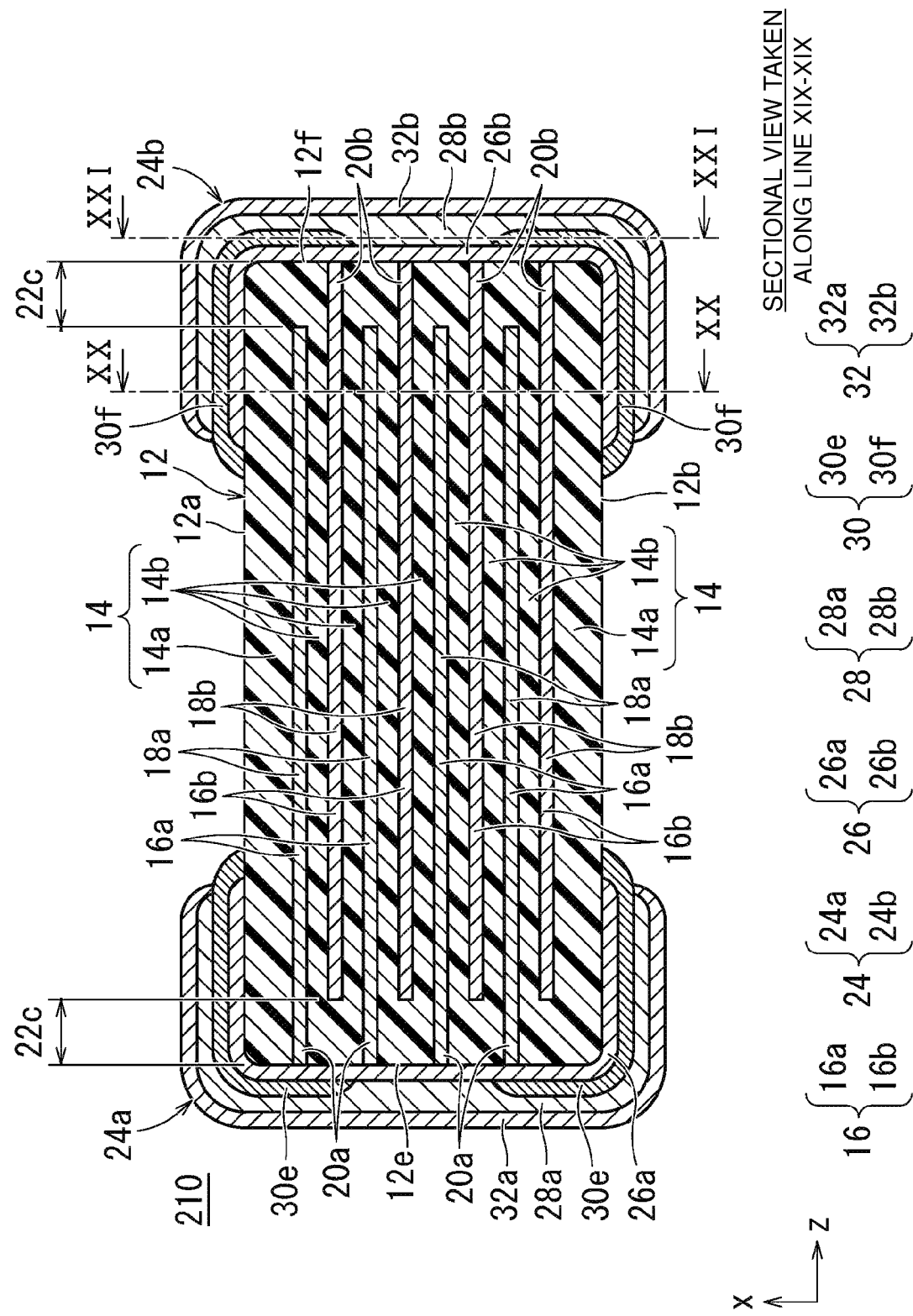
FIG. 19 is a sectional view that is taken along line XIX-XIX in FIG. 18 and illustrates the multilayer ceramic capacitor according to the third preferred embodiment of the present invention.
Figure 20:
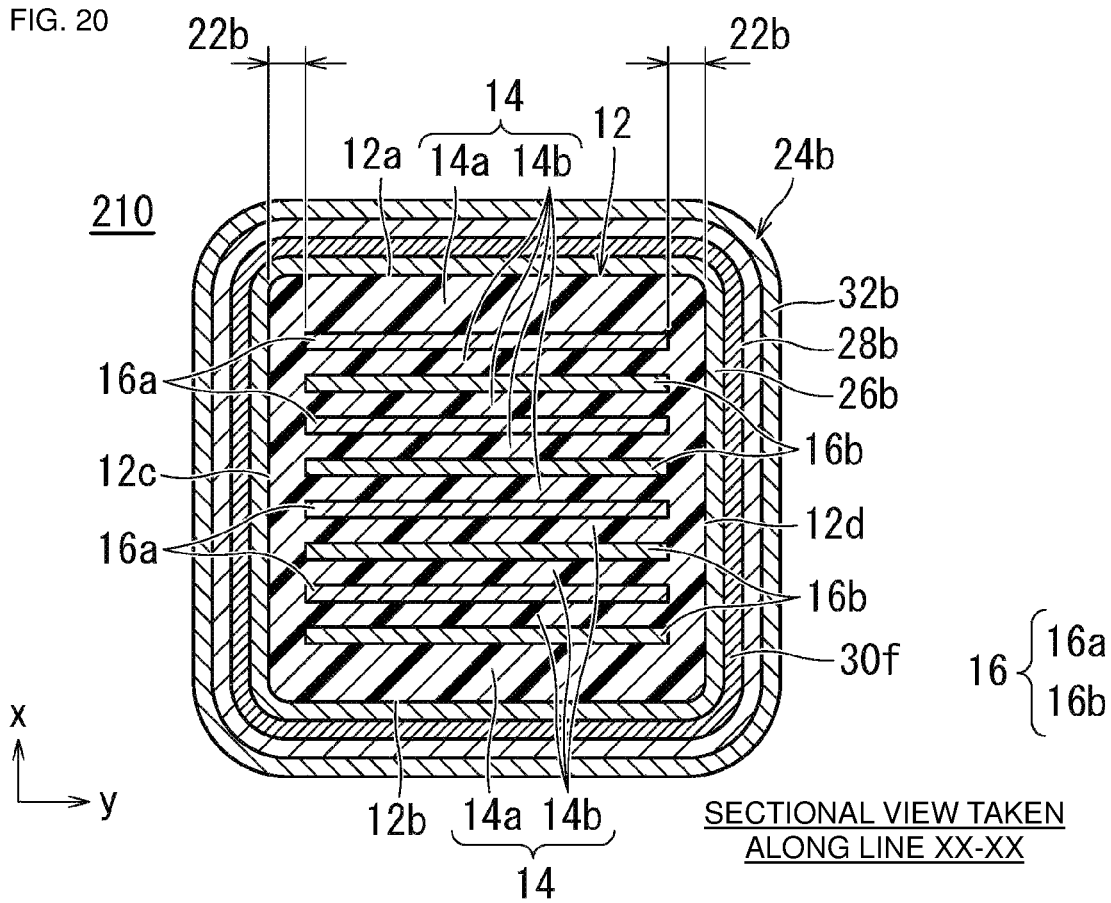
FIG. 20 is a sectional view that is taken along line XX-XX in FIG. 19 and illustrates the multilayer ceramic capacitor according to the third preferred embodiment of the present invention.
Figure 21:
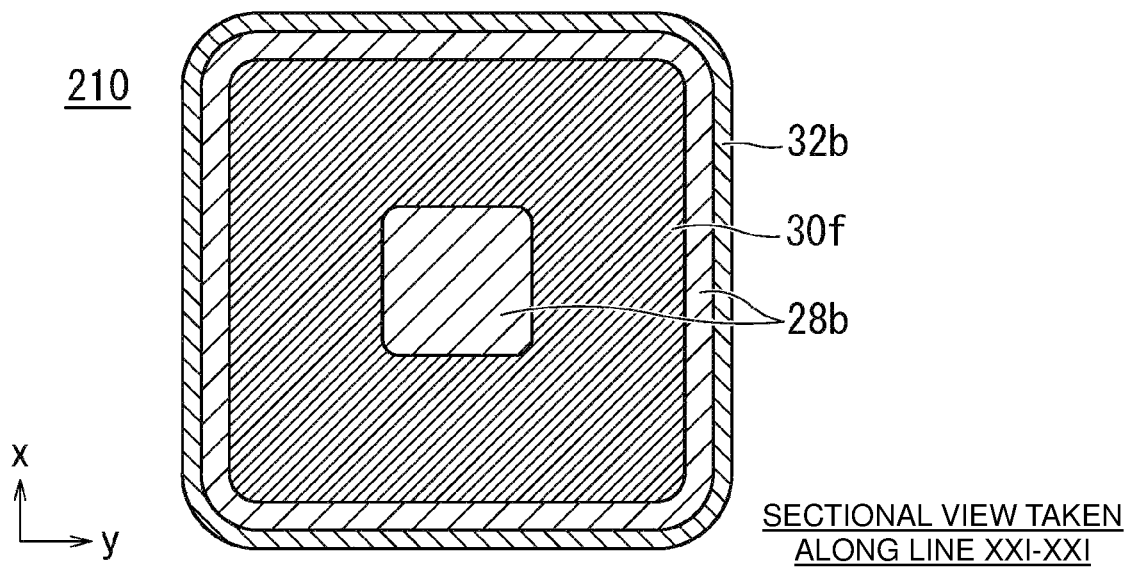
FIG. 21 is a sectional view that is taken along line XXI-XXI in FIG. 19 and illustrates the multilayer ceramic capacitor according to the third preferred embodiment of the present invention.

Hereafter, a multilayer ceramic capacitor according to a third preferred embodiment of the present invention will be described. FIG. 18 is an external perspective view illustrating an example of a multilayer ceramic capacitor according to the third preferred embodiment of the present invention. FIG. 19 is a sectional view taken along line XIX-XIX in FIG. 18 and illustrates the multilayer ceramic capacitor according to the third preferred embodiment of the present invention, FIG. 20 is a sectional view taken along line XX-XX in FIG. 19 and illustrates the multilayer ceramic capacitor according to the third preferred embodiment of the present invention, and FIG. 21 is a sectional view taken along line XXI-XXI in FIG. 19 and illustrates the multilayer ceramic capacitor according to the third preferred embodiment of the present invention. A multilayer ceramic capacitor 210 according to this preferred embodiment has substantially the same configuration as the multilayer ceramic capacitor 10 described using FIG. 1 except that the resin layers of the outer electrodes are arranged in a different manner. Therefore, the portions that are the same as in the multilayer ceramic capacitor 10 illustrated in FIG. 1 are denoted by the same symbols and description thereof is omitted.

The resin layers 30 of the multilayer ceramic capacitor 210 include a fifth resin layer 30e and a sixth resin layer 30f.

The fifth resin layer 30e is located between the first base electrode layer 26a and the first resin electrode layer 28a in a region of the first end surface 12e other than the center portion of the first end surface 12e. In other words, the fifth resin layer 30e is located between the first base electrode layer 26a and the first resin electrode layer 28a so as to extend along a peripheral portion of the first end surface 12e. In addition, the fifth resin layer 30e is provided at least between the first base electrode layer 26a and the first resin electrode layer 28a in regions located on the first main surface 12a, the second main surface 12b, the first side surface 12c, and the second side surface 12d. Specifically, the fifth resin layer 30e is provided on the surface of the first base electrode layer 26a in a region of the first end surface 12e other than the center portion of the first end surface 12e, on the surface of the portion of the first base electrode layer 26a located on the first main surface 12a, on the surface of the portion of the first base electrode layer 26a located on the second main surface 12b, on the surface of the portion of the first base electrode layer 26a located on the first side surface 12c, and on the surface of the portion of the first base electrode layer 26a located on the second side surface 12d. Therefore, the fifth resin layer 30e is provided so as to extend from the first end surface 12e onto the first main surface 12a, the second main surface 12b, the first side surface 12c, and the second side surface 12d.

The sixth resin layer 30f is located between the second base electrode layer 26b and the second resin electrode layer 28b in a region of the second end surface 12f other than the center portion of the second end surface 12f. In other words, the sixth resin layer 30f is located between the second base electrode layer 26b and the second resin electrode layer 28b so as to extend along a peripheral portion of the second end surface 12f. In addition, the sixth resin layer 30f is provided at least between the second base electrode layer 26b and the second resin electrode layer 28b in regions located on the first main surface 12a, the second main surface 12b, the first side surface 12c, and the second side surface 12d. Specifically, the sixth resin layer 30f is provided on the surface of the second base electrode layer 26b in a region of the second end surface 12f other than the center portion of the second end surface 12f, on the surface of the portion of the second base electrode layer 26b located on the first main surface 12a, on the surface of the portion of the second base electrode layer 26b located on the second main surface 12b, on the surface of the portion of the second base electrode layer 26b located on the first side surface 12c, and on the surface of the portion of the second base electrode layer 26b located on the second side surface 12d. Therefore, the sixth resin layer 30f is provided so as to extend from the second end surface 12f onto the first main surface 12a, the second main surface 12b, the first side surface 12c, and the second side surface 12d.

The resin electrode layers 28 include the first resin electrode layer 28a and the second resin electrode layer 28b.

The first resin electrode layer 28a is electrically connected to the first base electrode layer 26a only in the center portion of the first end surface 12e, and in addition, the first resin electrode layer 28a is provided so as to cover the first base electrode layer 26a with the fifth resin layer 30e interposed therebetween in the peripheral portion of the first end surface 12e. Specifically, the first resin electrode layer 28a is provided so as to cover the first base electrode layer 26a with the fifth resin layer 30e interposed therebetween on the surface of the first base electrode layer 26a in a region of the first end surface 12e other than the center portion of the first end surface 12e, on the surface of the portion of the first base electrode layer 26a located on the first main surface 12a, on the surface of the portion of the first base electrode layer 26a located on the second main surface 12b, on the surface of the portion of the first base electrode layer 26a located on the first side surface 12c, and on the surface of the portion of the first base electrode layer 26a located on the second side surface 12d.

The second resin electrode layer 28b is electrically connected to the second base electrode layer 26b only in the center portion of the second end surface 12f, and in addition, the second resin electrode layer 28b is provided so as to cover the second base electrode layer 26b with the sixth resin layer 30f interposed therebetween in the peripheral portion of the second end surface 12f. Specifically, the second resin electrode layer 28b is provided so as to cover the second base electrode layer 26b with the sixth resin layer 30f interposed therebetween on the surface of the second base electrode layer 26b in a region of the second end surface 12f other than the center portion of the second end surface 12f, on the surface of the portion of the second base electrode layer 26b located on the first main surface 12a, on the surface of the portion of the second base electrode layer 26b located on the second main surface 12b, on the surface of the portion of the second base electrode layer 26b located on the first side surface 12c, and on the surface of the portion of the second base electrode layer 26b located on the second side surface 12d.

According to the multilayer ceramic capacitor 210 illustrated in FIG. 18, the same effects as with the multilayer ceramic capacitor 110 illustrated in FIG. 10 are realized, and the following effect is also realized.

Since the resin layers 30 are also provided on the first side surface 12c and the second side surface 12d rather than just on the first main surface 12a and the second main surface 12b, the multilayer ceramic capacitor is able to be mounted on a substrate using any of the first main surface 12a, the second main surface 12b, the first side surface 12c, and the second side surface 12d, and there is no need to determine the mounting direction of the multilayer ceramic capacitor when taping the multilayer ceramic capacitor (that is, when storing the multilayer ceramic capacitor in a tape molded to have recessed portions). This is particularly advantageous in the case where the T dimension and the W dimension of the multilayer ceramic capacitor are the same.

In addition, since the resin electrode layers 28 are electrically connected to the base electrode layers 26 in the center portions of the first end surface 12e and the second end surface 12f, electrical conductivity is able to be ensured between the base electrode layers 26 and the resin electrode layers 28 in addition to the above-described effects achieved by various preferred embodiments of the present invention.

Figure 22:
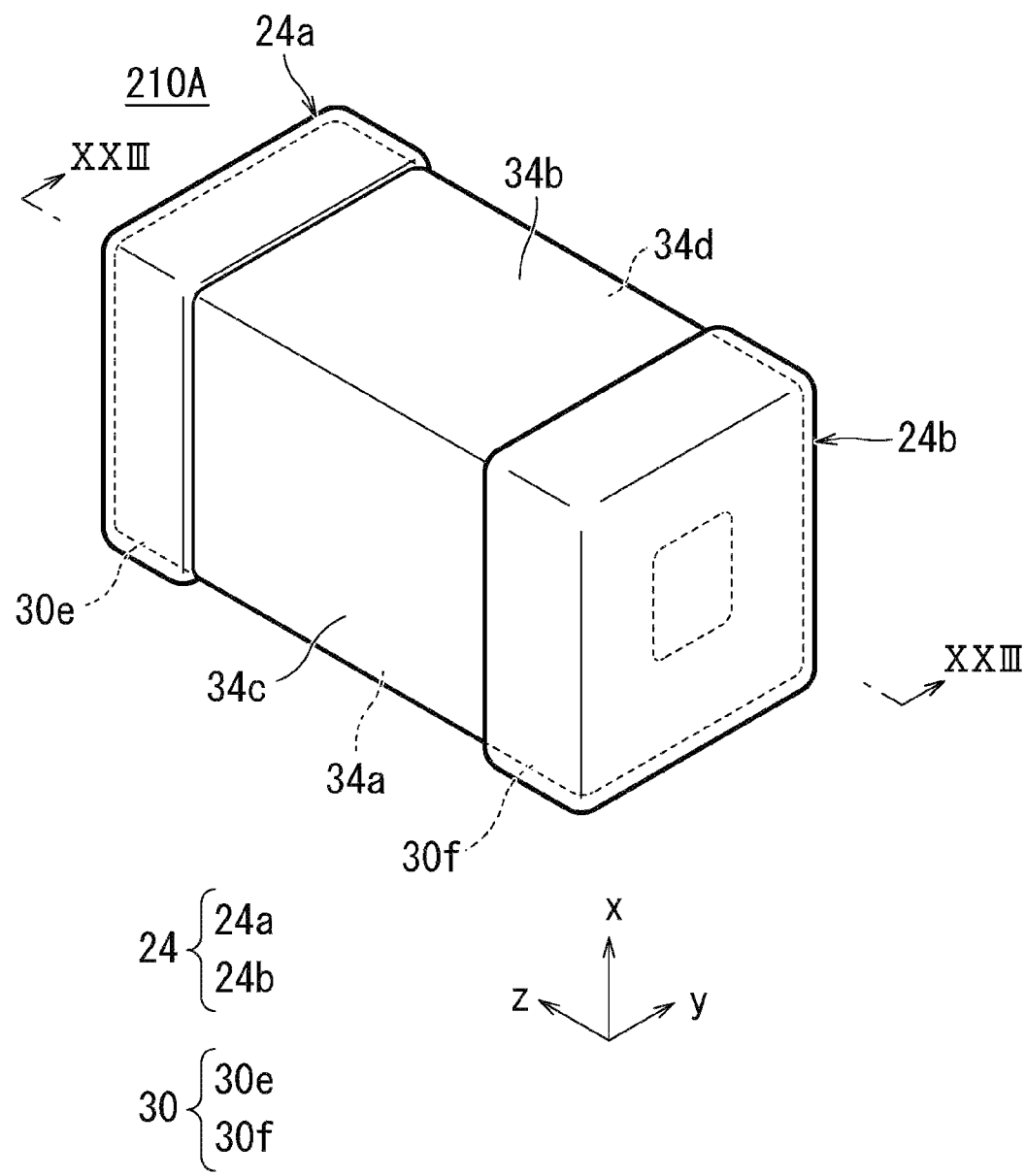
FIG. 22 is an external perspective view illustrating an example of a multilayer ceramic capacitor according to a modification of the third preferred embodiment of the present invention.
Figure 23:
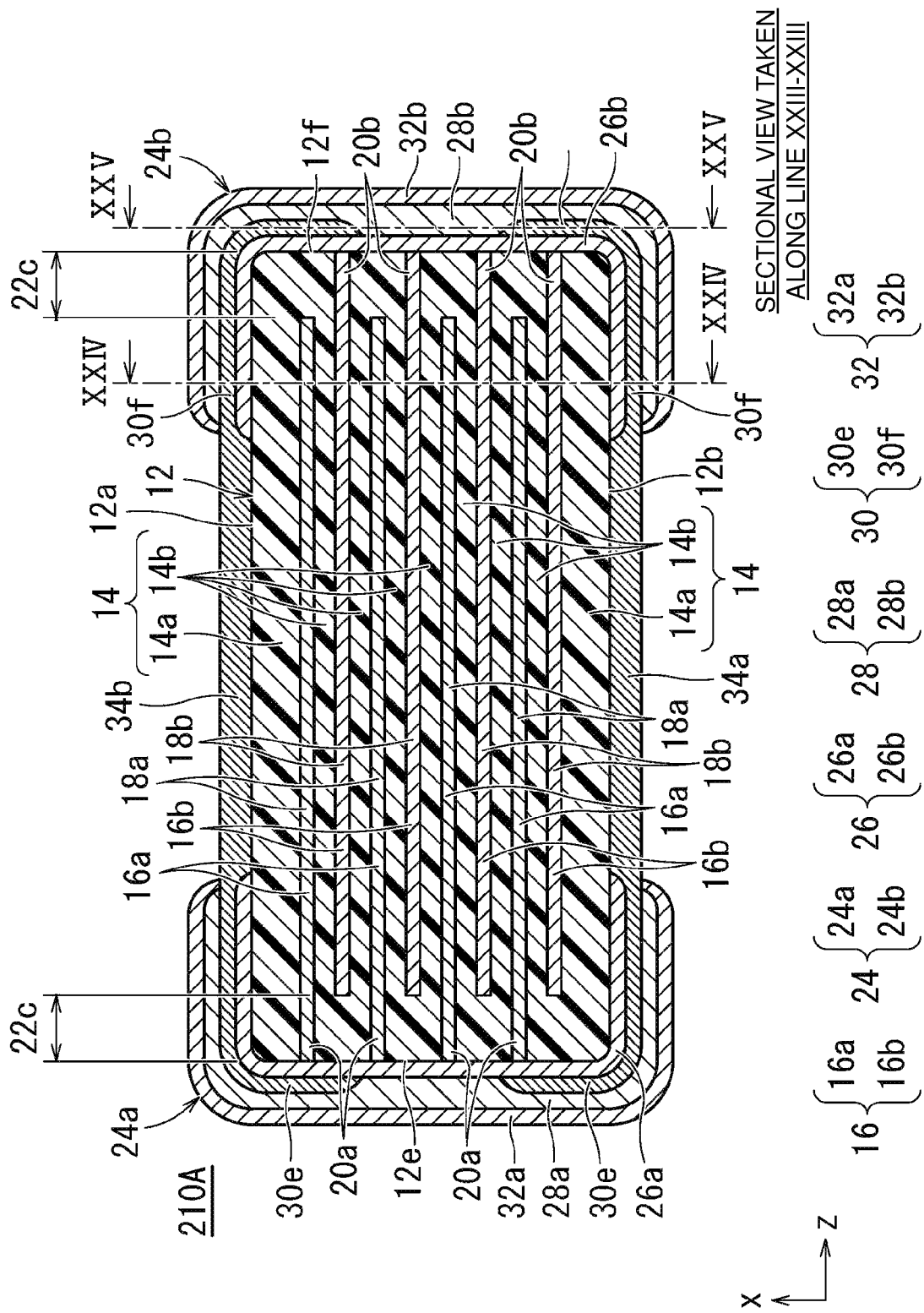
FIG. 23 is a sectional view that is taken along line XXIII-XXIII in FIG. 22 and illustrates the multilayer ceramic capacitor according to the modification of the third preferred embodiment of the present invention.
Figure 24:
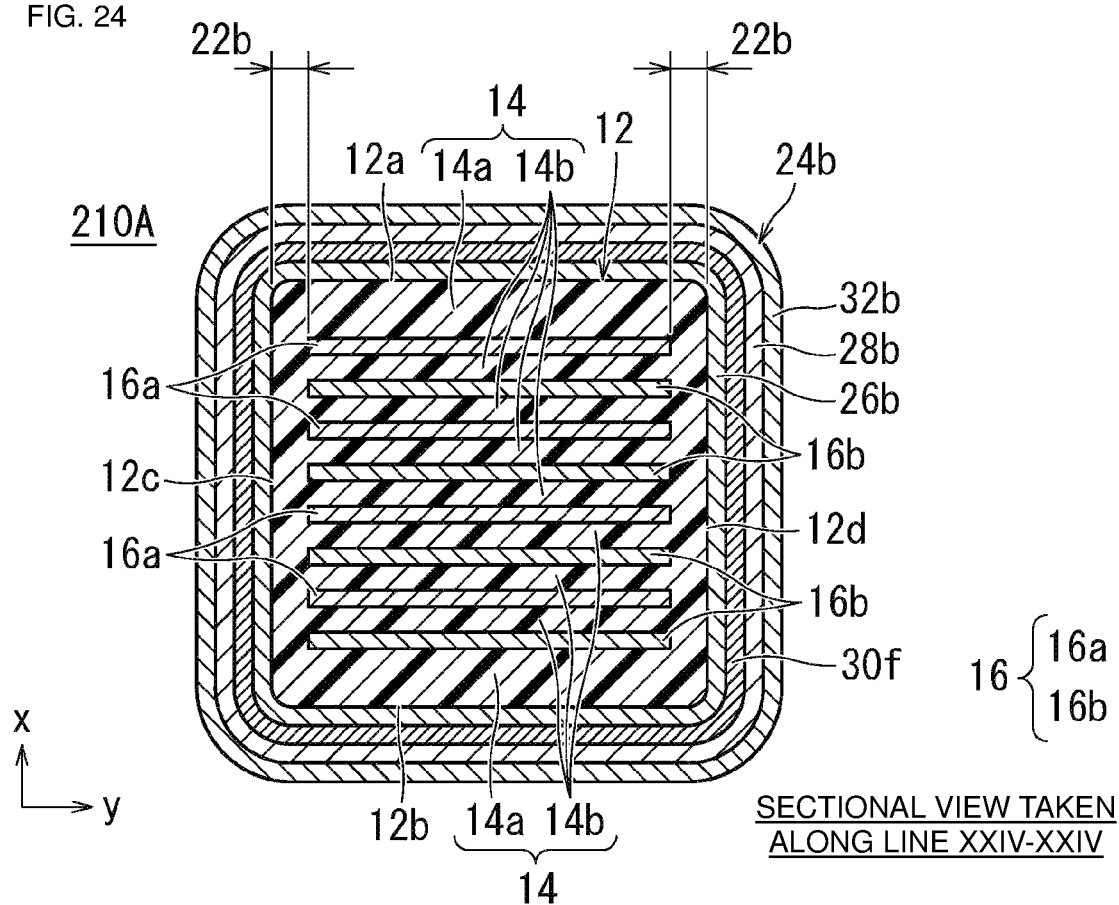
FIG. 24 is a sectional view that is taken along line XXIV-XXIV in FIG. 23 and illustrates the multilayer ceramic capacitor according to the modification of the third preferred embodiment of the present invention.
Figure 25:
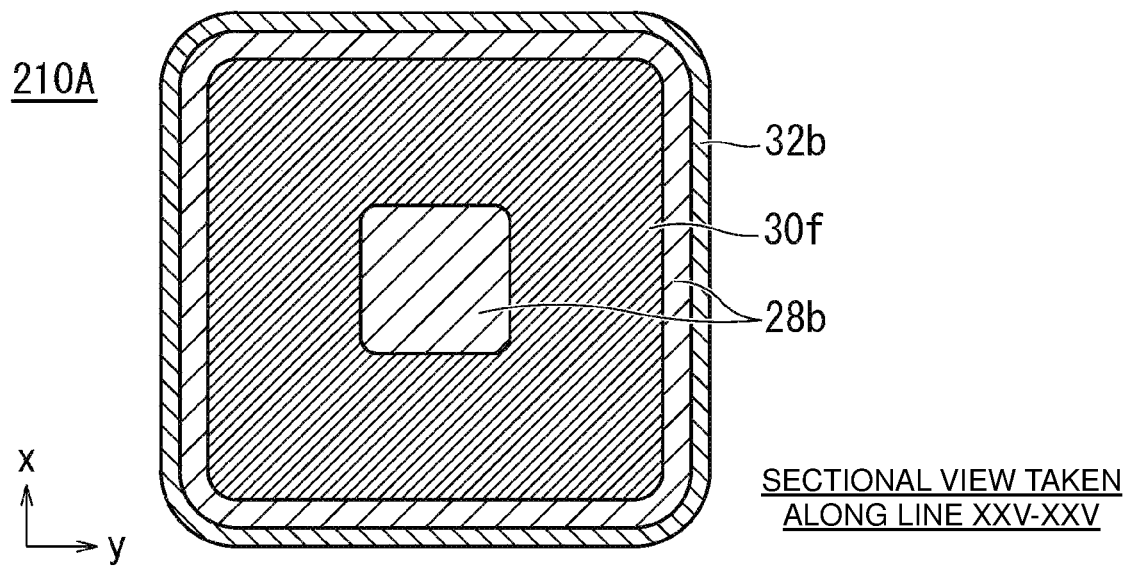
FIG. 25 is a sectional view that is taken along line XXV-XXV in FIG. 23 and illustrates the multilayer ceramic capacitor according to the modification of the third preferred embodiment of the present invention.

Next, a multilayer ceramic capacitor according to a modification of the third preferred embodiment of the present invention will be described. FIG. 22 is an external perspective view illustrating an example of a multilayer ceramic capacitor according to the modification of the third preferred embodiment of the present invention. FIG. 23 is a sectional view taken along line XXIII-XXIII in FIG. 22 and illustrates the multilayer ceramic capacitor according to the modification of the third preferred embodiment of the present invention, FIG. 24 is a sectional view taken along line XXIV-XXIV in FIG. 23 and illustrates the multilayer ceramic capacitor according to the modification of the third preferred embodiment of the present invention, FIG. 25 is a sectional view taken along line XXV-XXV in FIG. 23 and illustrates the multilayer ceramic capacitor according to the modification of the third preferred embodiment of the present invention. A multilayer ceramic capacitor 210A according to this preferred embodiment has substantially the same configuration as the multilayer ceramic capacitor 10 described using FIG. 1 except that the resin layers of the outer electrodes are arranged in a different manner. Therefore, the portions that are the same as in the multilayer ceramic capacitor 10 illustrated in FIG. 1 are denoted by the same symbols and description thereof is omitted.

The resin layers 30 of the multilayer ceramic capacitor 210A include the fifth resin layer 30e and the sixth resin layer 30f. The way in which the fifth resin layer 30e and the sixth resin layer 30f are structured is the same as in the multilayer ceramic capacitor 210 and therefore description thereof is omitted.

The first covering portion 34a is located between the fifth resin layer 30e and the sixth resin layer 30f on the second main surface 12b so as to cover the region where the resin layers 30 are not located (region where surface of multilayer body 12 is exposed), and the second covering portion 34b is located between the fifth resin layer 30e and the sixth resin layer 30f on the first main surface 12a so as to cover the region where the resin layers 30 are not located (region where surface of multilayer body 12 is exposed).

Furthermore, a third covering portion 34c is located between the fifth resin layer 30e and the sixth resin layer 30f on the first side surface 12c so as to cover the region where the resin layers 30 are not located (region where surface of multilayer body 12 is exposed), and a fourth covering portion 34d is located between the fifth resin layer 30e and the sixth resin layer 30f on the second side surface 12d so as to cover the region where the resin layers 30 are not located (region where surface of multilayer body 12 is exposed).

In addition, the material of the first covering portion 34a, the second covering portion 34b, the third covering portion 34c, and the fourth covering portion 34d is the same as that of the resin layers 30.

According to the multilayer ceramic capacitor 210A illustrated in FIG. 22, the same effects as with the multilayer ceramic capacitor 210 illustrated in FIG. 18 are realized, and the following effect is also realized.

That is, in the process of manufacturing the multilayer ceramic capacitor 210A, there is no need to perform masking in order to cause portions of the first main surface 12a, the second main surface 12b, the first side surface 12c, and the second side surface 12d to be exposed, and therefore the resin layers 30 are easily formed.

Next, a non-limiting example of a method of manufacturing the multilayer ceramic capacitor 10 illustrated in FIG. 1 will be described as a preferred embodiment of a method of manufacturing a multilayer ceramic capacitor having the above-described configuration.

First, ceramic green sheets, an inner electrode conductive paste that is for forming the inner electrode layers 16, and an outer electrode conductive paste that is for forming the base electrode layers 26 of the outer electrodes 24 are prepared. The ceramic green sheets, the inner electrode conductive paste, and the outer electrode conductive paste contain an organic binder and a solvent, and a known organic binder and a known organic solvent can be used.

Then, inner electrode patterns are formed on the ceramic green sheets by applying the inner electrode conductive paste onto the ceramic green sheets in prescribed patterns for example. The inner electrode conductive paste can be applied using a known method such as a screen printing method or a gravure printing method, for example.

A mother multilayer body is manufactured by stacking a prescribed number of outer layer ceramic green sheets on which inner electrode patterns have not been printed, sequentially stacking thereon ceramic green sheets on which inner electrode patterns have been printed, and stacking thereon a predetermined number of outer layer ceramic green sheets. The mother multilayer body may be subjected to pressure bonding in the height direction x by using an isostatic press, for example, as required.

Next, the mother multilayer body is cut into pieces having a prescribed shape and dimensions, and raw multilayer body chips are thus cut out. At this time, the corner portions and the edge portions of the multilayer bodies may be rounded by performing barrel polishing, for example. Next, the cut out raw multilayer body chips are fired, and multilayer bodies are thus formed. The firing temperature of the raw multilayer body chips depends on the ceramic material and the material of the inner electrode conductive paste, but is preferably around 900-1300° C., for example.

Next, the base electrode layers 26 are formed. The first base electrode layer 26a of the first outer electrode 24a and the second base electrode layer 26b of the second outer electrode 24b are formed by first applying the outer electrode conductive paste to both end surfaces of a fired multilayer body chip and then performing baking. The baking temperature is preferably around 700-900° C., for example.

Next, the resin electrode layers 28 and the resin layers 30 are formed. There are two methods that could be used to form the resin electrode layers 28 and the resin layers 30. These methods will be described hereafter.

The first method will be described next.

A resin paste is applied to the multilayer body chip on which the base electrode layers have been formed by immersing the multilayer body chip on which the base electrode layers have been formed to an arbitrary depth in a resin paste tank, which has been filled with the resin paste, such that the second main surface of the multilayer body chip, which will become the mounting surface, is parallel or substantially parallel to the surface of the resin paste. After that, formation of the resin layers is completed by performing heat treatment at a temperature of around 250-550° C., for example, in order to thermally cure the resin paste. Masking is performed on portion of the second main surface so that resin paste will not be deposited and that portion of the second main surface will be exposed, and then the resin paste is applied. There is no need to perform masking in the case where the first covering portion is to be formed on the second main surface between the first resin layer and the second resin layer and portion of the second main surface is not to be exposed in the case where the multilayer ceramic capacitor 10A illustrated in FIG. 6 is to be formed.

The atmosphere used when performing the heat treatment is preferably an $N_2$ atmosphere. Furthermore, in order to prevent scattering of resin and oxidation of various metal components, the oxygen concentration is preferably controlled to be less than or equal to 100 ppm, for example.

The multilayer body chip on which the resin layers have been formed is held at either end surface thereof and electrically conductive resin paste is applied to the multilayer body chip on which the resin layers have been formed by immersing the multilayer body chip in an electrically conductive resin paste tank, which has been filled with an electrically conductive resin paste containing thermosetting resin and a metal component, such that the first and second end surfaces are substantially parallel to the surface of the electrically conductive resin paste until the base electrode layer is covered. In addition, the thickness at the end surface of the resin electrode layer may be controlled by removing unwanted paste from the end surface by pressing the multilayer body chip against a surface plate or the like after applying the electrically conductive resin paste in order to make the thickness at the end surface of the resin electrode layer uniform or substantially uniform.

After that, formation of the resin electrode layers is completed by performing heat treatment at a temperature of around 250-550° C., for example, in order to cure the electrically conductive resin paste.

The atmosphere used when performing the heat treatment is preferably an $N_2$ atmosphere. Furthermore, in order to prevent scattering of resin and oxidation of various metal components, the oxygen concentration is preferably controlled to be less than or equal to 100 ppm, for example.

The second method will be described next.

A resin paste is applied to the multilayer body chip on which the base electrode layers have been formed by immersing the multilayer body chip on which the base electrode layers have been formed to an arbitrary depth in a resin paste tank, which has been filled with the resin paste, such that the second main surface of the multilayer body chip, which will become the mounting surface, is substantially parallel to the surface of the resin paste. After that, drying is performed at a temperature of around 120-150° C. for a period of around 20-30 minutes, for example.

Then, the multilayer body chip to which the resin paste has been applied and dried is held at either end surface thereof and electrically conductive resin paste is applied to the multilayer body chip on which the resin layers have been formed by immersing the multilayer body chip in an electrically conductive resin paste tank, which has been filled with an electrically conductive resin paste containing a thermosetting resin and a metal component, such that the first and second end surfaces are substantially parallel to the surface of the electrically conductive resin paste until the base electrode layer is covered. In addition, the thickness at the end surface of the resin electrode layer may be controlled by removing unwanted paste from the end surface by pressing the multilayer body chip against a surface plate or the like after applying the electrically conductive resin paste in order to make the thickness at the end surface of the resin electrode layer uniform or substantially uniform.

After that, formation of the resin layers and the resin electrode layers is completed by performing a heat treatment at a temperature of around 250-550° C., for example, and thermally curing the dried resin paste and the dried electrically conductive paste.

Next, after the resin layers and the resin electrode layers have been formed using either of the above-described methods, the plating layers 32 are formed. First, a Ni plating layer that is the first plating layer is formed so as to cover the first resin electrode layer, and a Ni plating layer that is the second plating layer is formed so as to cover the second resin electrode layer. An electroplating method is used as the method to form these Ni plating layers.

In addition, as required, a Sn plating layer is formed on the surface of the Ni plating layer that is the first plating layer, and a Sn plating layer is formed on the surface of the Ni plating layer that is the second plating layer.

The multilayer ceramic capacitor 10 is manufactured as described above.

Next, for the multilayer ceramic capacitor obtained using the above-described method, test pieces of an example in which the resin layers are provided were prepared and test pieces of a comparative example in which the resin layers are not provided were prepared, and a substrate bending resistance test was performed. The first method was used as the method for forming the resin layers and the resin electrode layers.

In accordance with the multilayer ceramic capacitor manufacturing method described above, samples of the multilayer ceramic capacitor illustrated in FIG. 1 were manufactured having the specifications given below.

Example 1 is the multilayer ceramic capacitor 10 illustrated in FIG. 1 and is a multilayer ceramic capacitor having the following specifications.

Size (design values) of multilayer ceramic capacitor:
  length×width×height=0.640 mm×0.340 mm×0.340 mm
Material of dielectric layers: BaTiO$_3$
Capacitance: 1.0 μF
Rated voltage: 10 V
Material of inner electrodes: Ni
Structure of outer electrodes
Base Electrode Layers
  Material of base electrode layers: includes Cu and glass
  Thickness of base electrode layers: 10 μm (at thickest portion in a center portion of an end surface)
Resin Layers
  Structure: portion of surface of second main surface is exposed
  : formed to a height of 15% of T dimension from second main surface at both end surfaces of multilayer body
  Thickness of resin layers: 5 μm (at a portion located between a base electrode layer and a resin electrode layer)
  Resin: epoxy resin
Resin Electrode Layers
  Conductive filler (metal powder): Ag
  Resin: epoxy-based resin
  Thickness of electrically conductive resin layers: 15 μm (at a thickest portion in a center portion of an end surface)
  Plating layers: two-layer structure including Ni plating layer and Sn plating layer located on a surface of a Ni plating layer
  Thickness of Ni plating layer: 4.0 μm
  Thickness of Sn plating layer: 3.0 μm
  Example 2 is the multilayer ceramic capacitor 10A illustrated in FIG. 6. That is, in example 2, the resin layers are formed such that the surface where the second main surface is exposed (region where base electrode layers are not located) is covered by the first covering portion that is connected to the first resin layer and the second resin layer. The rest of the specifications are the same as in Example 1.

Figure 26:
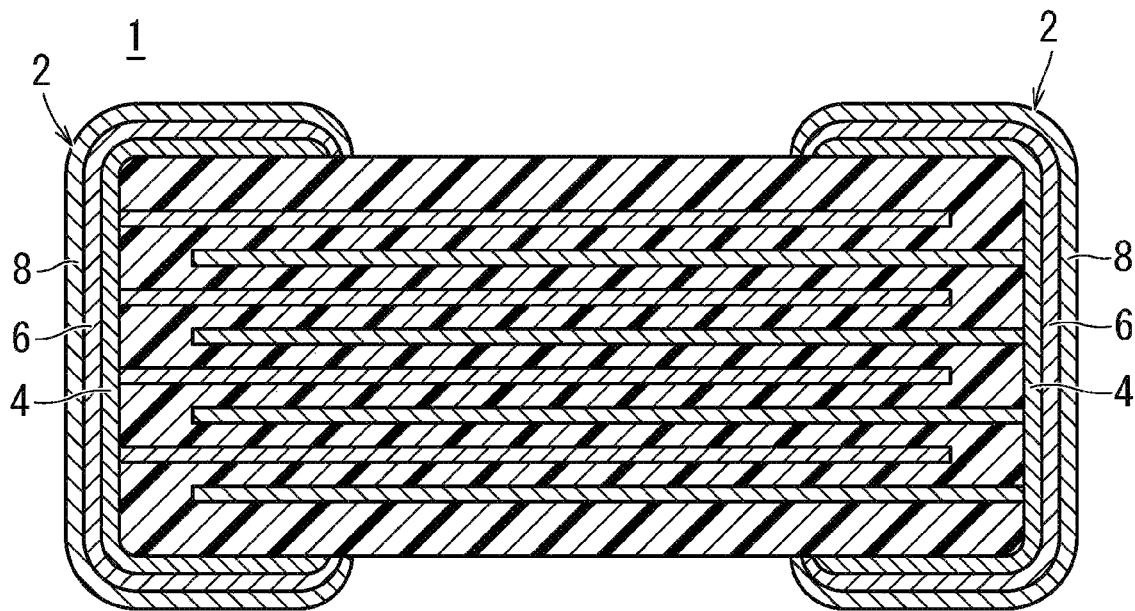
FIG. 26 is a sectional view of a multilayer ceramic capacitor according to comparative example 1.

In addition, for comparison, test piece multilayer ceramic capacitors that do not include the resin layers were manufactured. As illustrated in FIG. 26, a multilayer ceramic capacitor 1 of comparative example 1 has a configuration in which, in contrast to the multilayer ceramic capacitor 10 illustrated in FIG. 2, the resin layers are not provided, and in which outer electrodes 2 are formed of base electrode layers 4, resin electrode layers 6 that cover the base electrode layers 4, and plating layers 8 that cover the base electrode layers 4 and the resin electrode layers 6. The rest of the specifications are the same as in example 1.

Figure 27:
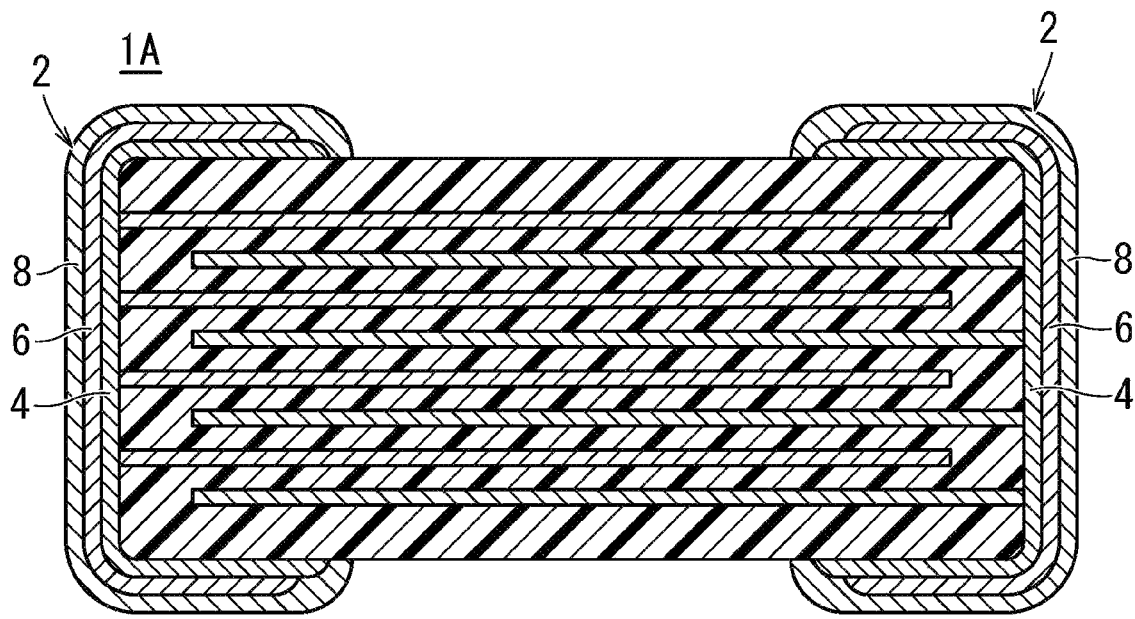
FIG. 27 is a sectional view of a multilayer ceramic capacitor according to comparative example 2.

In addition, as illustrated in FIG. 27, a multilayer ceramic capacitor 1A of comparative example 2 has a configuration in which, in contrast to the multilayer ceramic capacitor 10 illustrated in FIG. 2, the resin layers are not provided, and in which outer electrodes 2 are formed of base electrode layers 4, resin electrode layers 6 that cover the base electrode layers 4, and plating layers 8 that cover the base electrode layers 4 and the resin electrode layers 6. In addition, the resin electrode layers 6 are provided so as to be positioned back from the leading end portions of the base electrode layers 4 toward both end surfaces by around 50 μm, for example. The rest of the specifications were the same as in Example 1.

Substrate Bending Resistance Test

The multilayer ceramic capacitor samples were each mounted on a 0.8 mm thick JIS substrate (glass epoxy substrate) using solder paste. Mechanical stress was applied to the substrate by bending the substrate by pushing the substrate with a pushing rod having a diameter of 5 μm from the substrate surface on which the multilayer ceramic capacitor is not mounted. At this time, the pushing was maintained for 5 seconds and the bending amount was 8 mm. After bending the substrate, the multilayer ceramic capacitor sample was removed from the substrate, the multilayer ceramic capacitor sample was subjected to grinding in a direction perpendicular or substantially perpendicular to the substrate surface, observation was performed looking for cracks, and the number of samples in which a crack occurred in the test piece was counted. The number of samples of each type of test piece was n=10.

Table 1 illustrates the results obtained from the substrate bending resistance test for the test pieces of the multilayer ceramic capacitors.

TABLE 1

|  | Substrate Bending Resistance Test (Number) |
| --- | --- |
| Example 1 | 0/10 |
| Example 2 | 0/10 |
| Comparative Example 1 | 3/10 |
| Comparative Example 2 | 10/10 |

As illustrated in Table 1, the samples of Example 1 and Example 2 have the configurations of the preferred embodiments of the present invention, that is, resin layers are provided between the resin electrode layers and the base electrode layers on the mounting surface side, and therefore the base electrode layers are able to be covered by the resin layers with certainty. Therefore, design assurance of mechanical strength is able to be easily achieved and a highly reliable multilayer ceramic capacitor is able to be obtained without consideration of the control method used when forming the resin electrode layers and the accuracy. Although no defects occurred in the substrate bending resistance test in both Example 1 and Example 2, the multilayer ceramic capacitor of Example 2 can be more easily formed in terms of the manufacturing process.

On the other hand, defects occurred in 3 out of the 10 samples of comparative example 1, and defects occurred in all 10 sample of comparative example 2. From these results, the effectiveness of covering the base electrode layers with the resin electrode layers is demonstrated.

The present invention is not limited to the above-described preferred embodiments, and may be modified in various ways within the scope of gist of the present invention.

For example, although the first resin layer 30a is preferably provided in a region located on the second main surface 12b side of the first end surface 12e relative to the center portion of the first end surface 12e and the second resin layer 30b preferably is provided in a region located on the second main surface 12b side of the second end surface 12f relative to the center portion of the second end surface 12f in the multilayer ceramic capacitor 10, the preferred embodiments of the present invention are not limited to this example, and the first resin layer 30a may instead be provided so as to at least cover only the portion of the first base electrode layer 26a located on the second main surface 12b side and the second resin layer 30b may be provided so as to at least cover only the portion of the second base electrode layer 26b located on the second main surface 12b side.

Furthermore, in the multilayer ceramic capacitor 110, the first resin layer 30a preferably is provided in a region located on the second main surface 12b side of the first end surface 12e relative to the center portion of the first end surface 12e and the second resin layer 30b preferably is provided in a region located on the second main surface 12b side of the second end surface 12f relative to the center portion of the second end surface 12f, and additionally the third resin layer 30c preferably is provided in a region located on the first main surface 12a side of the first end surface 12e relative to the center portion of the first end surface 12e and the fourth resin layer 30d preferably is provided in a region located on the first main surface 12a side of the second end surface 12f relative to the center portion of the second end surface 12f, but the preferred embodiments of the present invention are not limited to this example, and the first resin layer 30a may instead be provided so as to at least cover only the portion of the first base electrode layer 26a located on the second main surface 12b side, the second resin layer 30b may instead be provided so as to at least cover only the portion of the second base electrode layer 26b located on the second main surface 12b side, the third resin layer 30c may instead be provided so as to at least cover only the portion of the first base electrode layer 26a located on the first main surface 12a side, and the fourth resin layer 30d may instead be provided so as to at least cover only the portion of the second base electrode layer 26b located on the first main surface 12a side.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of dielectric layers and a plurality of inner electrode layers that are stacked on top of one another, and including a first main surface and a second main surface that face each other in a height direction, a first side surface and a second side surface that face each other in a width direction, which is perpendicular or substantially perpendicular to the height direction, and a first end surface and a second end surface that face each other in a length direction, which is perpendicular or substantially perpendicular to the height direction and the width direction; and
   a pair of outer electrodes that are connected to the inner electrode layers and are provided on the end surfaces, a portion of the first main surface, a portion of the second main surface, a portion of the first side surface, and a portion of the second side surface; wherein the second main surface of the multilayer body defines and functions as a mounting surface;
   the pair of outer electrodes each include a base electrode layer that includes an electrically conductive metal and a glass component, a resin electrode layer that includes a thermosetting resin and a metal component, and a resin layer that does not include an electrically conductive component;
   the base electrode layers respectively extend from the first end surface and the second end surface onto a portion of the first main surface and a portion of the second main surface and onto a portion of the first side surface and a portion of the second side surface;
   the resin layers respectively cover the base electrode layers in at least regions located on the second main surface side and respectively extend from the second main surface side onto at least a portion of the first end surface and at least a portion of the second end surface;
   the resin electrode layers directly cover the base electrode layers in portions where the resin layers are not located on the first end surface and the second end surface and cover the resin layers;
   the resin electrode layers directly cover the base electrode layers at at least center-most portions of the first end surface and the second end surface;
   an entirety of each of the resin electrode layers includes a conductive paste having only one composition; and
   the conductive paste includes the thermosetting resin and the metal component.

2. The multilayer ceramic capacitor according to claim 1, wherein the resin layers entirely cover a region of the second main surface where the base electrode layers are not located.

3. The multilayer ceramic capacitor according to claim 1, wherein a total of a thickness of the resin layer on the base electrode layer located on the first main surface, the second main surface, the first side surface, or the second side surface and a thickness of the resin electrode layer located on the resin layer is the same or substantially the same as a thickness of the resin electrode layer directly provided on the base electrode layer located on the first end surface or the second end surface.

4. The multilayer ceramic capacitor according to claim 1, wherein plating layers are provided on the resin electrode layers.

5. The multilayer ceramic capacitor according to claim 1, wherein
   the resin layers cover the base electrode layers in at least a region located on the first main surface side; and
   the resin electrode layers cover the base electrode layers in portions where the resin layers are not located and cover the resin layers.

6. The multilayer ceramic capacitor according to claim 1, wherein
   the resin layers cover the base electrode layers in regions located on the first side surface side and the second side surface side.

7. The multilayer ceramic capacitor according to claim 6, wherein
   the resin layers are provided on the first side surface side and the second side surface side so as to extend onto at least the portion of the first end surface and at least the portion of the second end surface;
   the resin electrode layers are directly connected to the base electrode layers only at center portions of the first end surface and the second end surface and cover the resin layers; and
   the center portions of the first end surface and the second end surface include the center-most portions of the first end surface and the second end surface.

8. The multilayer ceramic capacitor according to claim 1, wherein each of the resin electrode layers includes a first resin electrode layer and a second resin electrode layer.

9. The multilayer ceramic capacitor according to claim 1, wherein the resin electrode layers completely cover the base electrode layers.

10. The multilayer ceramic capacitor according to claim 1, wherein the resin electrode layers are shorter than the base electrode layers.

11. The multilayer ceramic capacitor according to claim 1, wherein the thermosetting resin includes at least one of epoxy resin, a phenol resin, a urethane resin, a silicone resin, and a polyimide resin.

12. The multilayer ceramic capacitor according to claim 1, wherein the resin electrode layers include a curing agent.

13. The multilayer ceramic capacitor according to claim 1, wherein the metal component includes one of Ag, Cu, an alloy of Ag, and an alloy of Cu.

14. The multilayer ceramic capacitor according to claim 1, wherein the metal component includes metal powder particles coated with Ag.

15. The multilayer ceramic capacitor according to claim 14, wherein the metal powder particles are made of Ni or Cu.

16. The multilayer ceramic capacitor according to claim 1, wherein the metal component is about 35-75 percent by volume of an entire volume of the resin electrode layers.

17. The multilayer ceramic capacitor according to claim 1, wherein each of the resin layers includes a first resin layer and a second resin layer.

18. The multilayer ceramic capacitor according to claim 1, wherein a material of the resin layers includes one of epoxy resin, a phenol resin, a urethane resin, a silicone resin, and a polyimide resin.

* * * * *